United States Patent
Wadsworth

(10) Patent No.: US 12,427,729 B2
(45) Date of Patent: Sep. 30, 2025

(54) METHOD OF JOINING MOLDED OR THREE-DIMENSIONAL PRINTED PARTS TO THERMOPLASTIC COMPOSITE STRUCTURES

(71) Applicant: Spirit AeroSystems, Inc., Wichita, KS (US)

(72) Inventor: Mark Anthony Wadsworth, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 474 days.

(21) Appl. No.: 17/828,999

(22) Filed: May 31, 2022

(65) Prior Publication Data
US 2022/0288873 A1 Sep. 15, 2022

Related U.S. Application Data

(63) Continuation-in-part of application No. 17/028,569, filed on Sep. 22, 2020, now Pat. No. 11,459,081,
(Continued)

(51) Int. Cl.
*B29C 70/34* (2006.01)
*B29C 70/54* (2006.01)
(Continued)

(52) U.S. Cl.
CPC .......... *B29C 70/342* (2013.01); *B29C 70/544* (2021.05); *B33Y 80/00* (2014.12);
(Continued)

(58) Field of Classification Search
CPC ... B29C 70/342; B29C 70/54; B29K 2101/12; B32B 37/10
See application file for complete search history.

(56) References Cited

U.S. PATENT DOCUMENTS

| | | | |
|---|---|---|---|
| 3,676,285 A | 7/1972 | Agens et al. | |
| 4,333,779 A | 6/1982 | Rinker | |

(Continued)

FOREIGN PATENT DOCUMENTS

| | | |
|---|---|---|
| CN | 105936131 | 9/2016 |
| EP | 2452808 | 5/2012 |

(Continued)

OTHER PUBLICATIONS

European Search Report in related EP Application 23167627.1 dated Oct. 20, 2023, 9 pages.
(Continued)

*Primary Examiner* — Christopher T Schatz
(74) *Attorney, Agent, or Firm* — Stinson LLP

(57) ABSTRACT

A method for fusing thermoplastic composite structures includes placing a thermoplastic substructure on an inner surface of a skin that is laid up on a shaping surface of a tool configured to maintain the shape of an outer mold line. The method further includes applying at least one metal layer over the substructure and applying an insulation layer over edge portions of the substructure and over exposed portions of the inner surface of the skin not in contact with the substructure and applying a vacuum bag that at least partly encloses the skin, the substructure, and the metal layer. The method yet still further includes applying heat to the shaping surface to fuse the substructure to the skin such that the skin exceeds its melting point and at least a portion of a raised segment of the substructure does not exceed its melting point.

5 Claims, 11 Drawing Sheets

Related U.S. Application Data which is a continuation-in-part of application No. PCT/US2020/031784, filed on May 7, 2020, and a continuation-in-part of application No. 16/404,794, filed on May 7, 2019, now Pat. No. 10,828,880.

(51) Int. Cl.
*B33Y 80/00* (2015.01)
*B29K 101/12* (2006.01)
*B29L 31/30* (2006.01)

(52) U.S. Cl.
CPC ...... *B29K 2101/12* (2013.01); *B29K 2905/00* (2013.01); *B29L 2031/3082* (2013.01)

(56) References Cited

U.S. PATENT DOCUMENTS

| | | |
|---|---|---|
| 4,915,896 A | 4/1990 | Rachal et al. |
| 4,957,577 A | 9/1990 | Huebner |
| 5,593,633 A | 1/1997 | Dull et al. |
| 5,735,986 A | 4/1998 | Fell |
| 6,391,246 B2 | 5/2002 | Shiraishi et al. |
| 9,731,453 B2 | 8/2017 | Humfeld et al. |
| 11,459,081 B2 | 10/2022 | Wadsworth |
| 2010/0252180 A1 | 10/2010 | Rincon et al. |
| 2011/0209812 A1 | 9/2011 | Bansal et al. |
| 2015/0274911 A1* | 10/2015 | Suzuki ...................... B32B 7/06 156/60 |
| 2021/0009251 A1* | 1/2021 | Wadsworth ....... B29C 66/81455 |

FOREIGN PATENT DOCUMENTS

| | | |
|---|---|---|
| JP | 05329355 | 12/1993 |
| WO | 2020227477 | 11/2020 |

OTHER PUBLICATIONS

International Search Report and Written Opinion in related PCT Application PCT/US2020/031784 filed May 7, 2020, 10 pages.
Non-Office Action mailed Jul. 22, 2022 in related CN application No. 202080006551.2, 29 pages.

\* cited by examiner

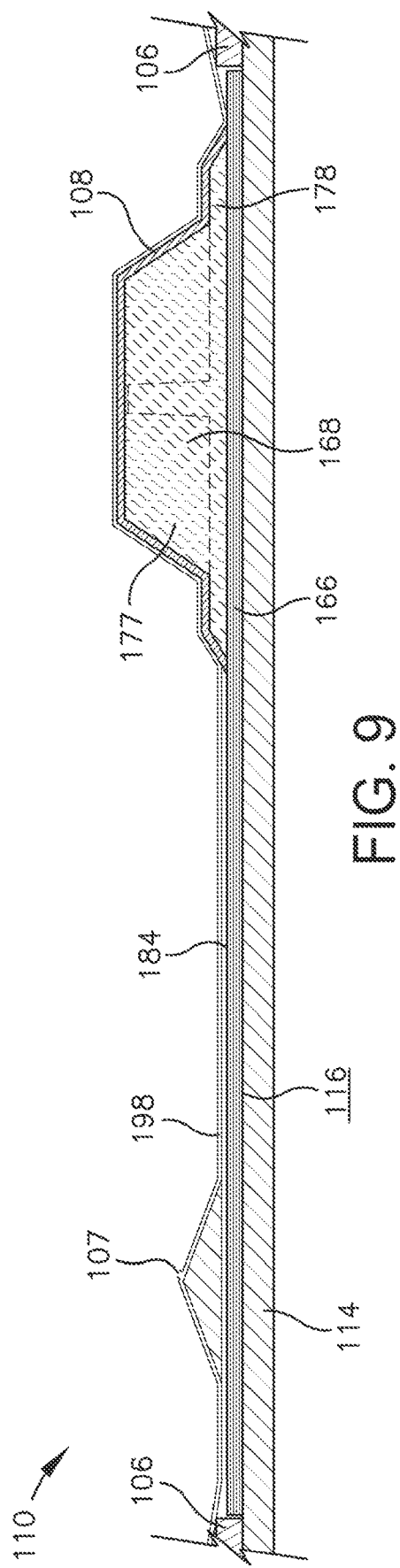

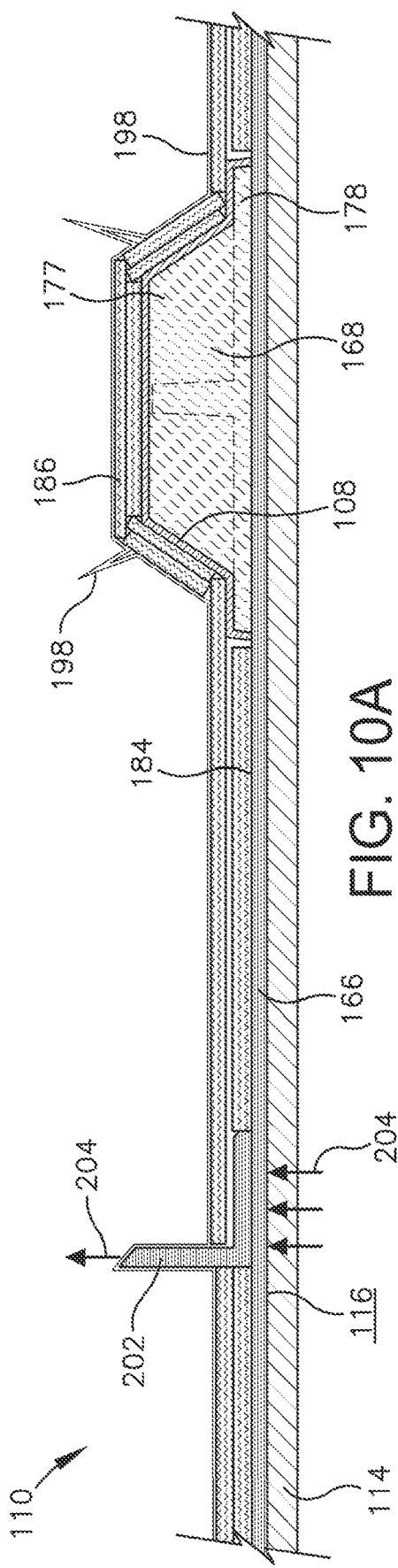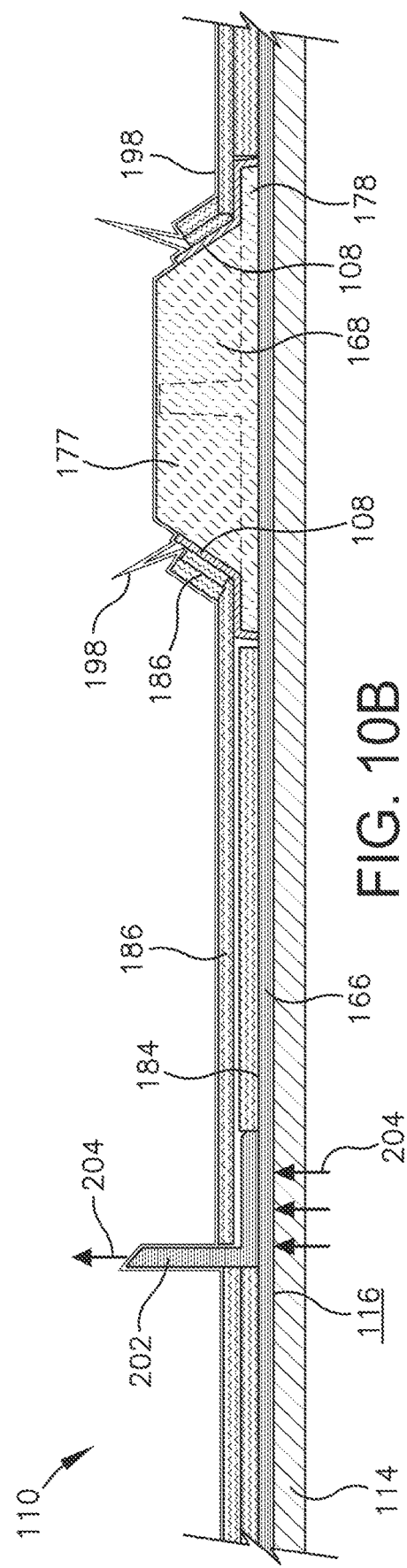

METHOD OF JOINING MOLDED OR THREE-DIMENSIONAL PRINTED PARTS TO THERMOPLASTIC COMPOSITE STRUCTURES

RELATED APPLICATIONS

The present application is a continuation-in-part of U.S. Non-Provisional patent application Ser. No. 17/028,569, filed on Sep. 22, 2020 and titled "Method of Fusing Thermoplastic Composite Structures," which is a continuation-in-part of International Application No. PCT/US20/31784, filed May 7, 2020 and also titled "Method of Fusing Thermoplastic Composite Structures," which claims the benefit of U.S. Non-Provisional patent application Ser. No. 16/404,794 (now U.S. Pat. No. 10,828,880), filed on May 7, 2019 and likewise titled "Method of Fusing Thermoplastic Composite Structures," each of which is hereby incorporated by reference in its entirety into the present application.

BACKGROUND OF THE INVENTION

Field of the Invention

Embodiments of the present invention relate to methods and systems for manufacturing composite parts. More particularly, embodiments of the present invention relate to methods and systems for manufacturing composite parts that utilize tooling positioned on one side of the part and a flexible bag positioned on the opposite side of the part.

Description of the Related Art

Complex parts, such as those used in aerospace applications, are often manufactured from composite materials. Because many such parts include three-dimensional characteristics such as height, depth, curvature, contours, or features that intersect at angles up to 90 degrees, they may require extra tooling and/or handling to manufacture. Where the composite parts comprise materials such as thermoplastics, the skin may include several layers which are first laid up and consolidated prior to laying up of any substructure that may be fixed to the skin. Following consolidation, the substructure may be laid up and the combination may be placed in an oven or autoclave for application of heat and fusing of the substructure to the skin. Traditional approaches for constructing and joining components of composite parts therefore may include multiple disparate steps utilizing different tooling, resulting in additional expense and time required for manufacture.

Furthermore, joining different complex-shaped components or substructures (e.g. thermoplastics, reinforced plastics) to the thermoplastic composite skin traditionally requires mechanical fasteners or alternatively a technique referred to as overmolding. Overmolding generally uses various molds and tooling to retain the shape of an injection-molded part during heating and fusing or welding of the substructures and the skin to each other. However, the size of parts compatible with overmolding is limited by press tonnage and size, driven by the high pressures needed for injection molding. In some examples, composite skins are completely contained inside the mold, making it costly to overmold multiple substructures onto a large skin, as large and expensive tooling would be required.

Another technique for creating complex-shaped components or substructures is via three-dimensional (3D) printing. However, when 3D printing onto the thermoplastic composite skin, the thermal mass and rate of deposition can limit the ability of the liquid feedstock (used by the printer) to fuse with the underlying skin. Furthermore, if the underlying skin is hot enough to weld with the liquid feedstock, there may be insufficient pressure to prevent undesirable deconsolidation of the laminate (i.e., the skin).

SUMMARY OF THE INVENTION

Embodiments of the present invention solve the above-mentioned problems and provide a distinct advance in the art of manufacturing composite parts. More particularly, embodiments of the invention provide a system and method for manufacturing composite parts from composite material which reduce the need for complex and costly components and lengthy manufacturing processes.

Various embodiments of the invention may provide a system and a method for joining injection molded or three-dimensional (3D) printed parts to thermoplastic composite structures. The composite part may include a thermoplastic composite skin or laminate and a substructure that is injection molded, 3D printed, or extruded to form its complex shape. The substructure may include a non-faying surface and a faying surface opposite the non-faying surface. The skin may have a first side and a second side opposite the first side. The second side of the skin may have (A) another faying surface contacting the faying surface of the substructure, and (B) an exposed portion not contacted by the substructure. The system may further include a highly-conductive metal foil or metal coating on the non-faying surface of the substructure. The metal foil or metal coating functions as a mold shell to prevent excessive deformation of the substructure.

The system may also include an insulation layer covering at least a portion of the metal layer, at least a portion of the substructure, and the exposed portion of the skin. The system may further include a tool having a shaping surface in a shape of an outer mold line. The shaping surface may receive (and may be in direct or indirect contact with) the first side of the skin. The system may further include a heating element supplying heat to the shaping surface. The system may still further include a vacuum bag covering the skin, the substructure, the metal foil or metal coating, and the insulation layer such that the composite part is enclosed by the combination of the vacuum bag and the shaping surface of the tool.

Various embodiments of the invention may also provide a method for fusing thermoplastic substructures with thermoplastic composite skins to form composite structures. The method may include the steps of laying a skin having an outer surface and an inner surface on a shaping surface of a tool for maintaining the outer surface in a shape of an outer mold line. The inner surface of the skin may have a first faying surface. The method may further include the steps of laying a substructure on the inner surface of the skin and applying at least one metal layer over at least a portion of the substructure. The substructure may have a second faying surface and a non-faying surface, and the second faying surface may contact the first faying surface of the skin. The substructure may be a thermoplastic component made by injection molding or other molding processes, three-dimensional printing, and/or extrusion prior to being laid on the inner surface of the skin. Furthermore, the method may include applying at least one insulation layer over at least a portion of the metal layer and over exposed portions of the inner surface of the skin not in contact with the substructure and applying a vacuum bag over the skin and the substructure such that the skin and the substructure are enclosed by the combination of the vacuum bag and the shaping surface of the tool. The method may also include a step of applying heat to the shaping surface to fuse the substructure to the skin such that the skin exceeds its melting point.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 3A is a partial sectional view of the system of FIG. 3, taken along line 3A-3A, illustrating a thermal break of flanges of the heating tool;

FIG. 9 is a partial, enlarged cross-sectional view of another alternative embodiment of the system wherein foil or metal coating is applied over an injection-molded substructure on the skin, in accordance with various embodiments of the present invention;

FIG. 10a is a partial, enlarged cross-sectional view of yet another alternative embodiment of the system wherein foil or metal coating is applied over an entirety of the substructure and insulation is applied over the foil or metal coating, in accordance with various embodiments of the present invention;

Figure 11:
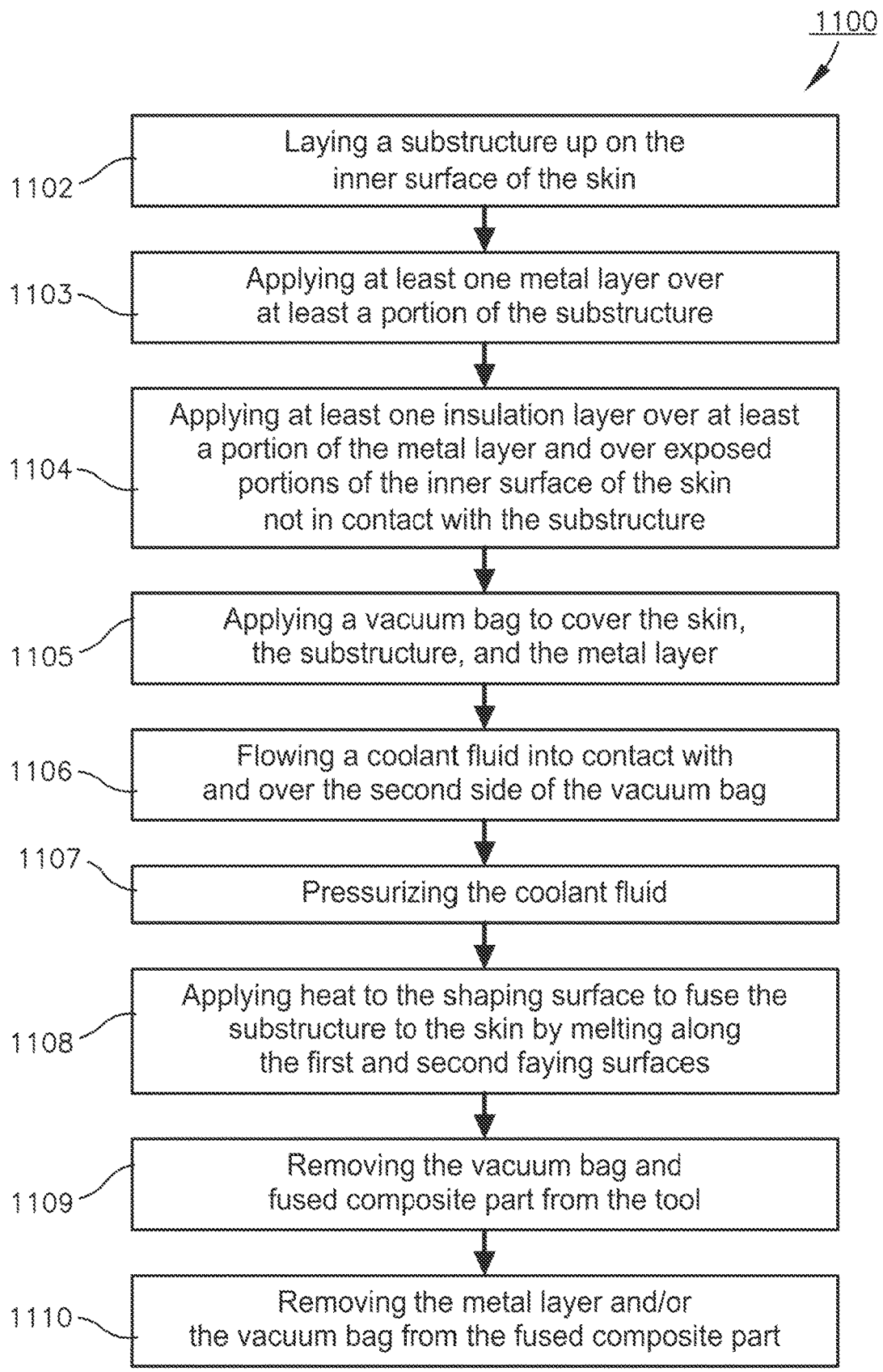

FIG. 10b is a partial, enlarged cross-section view of another alternative embodiment of the system wherein foil or metal coating is applied over only a portion of an injection molded substructure on the skin and insulation is selectively applied over at least a portion of the foil or metal coating, in accordance with various embodiments of the present invention; and FIG. 11 illustrates at least a portion of the steps of an exemplary method for manufacturing a composite part from composite material according to an alternative embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 1:
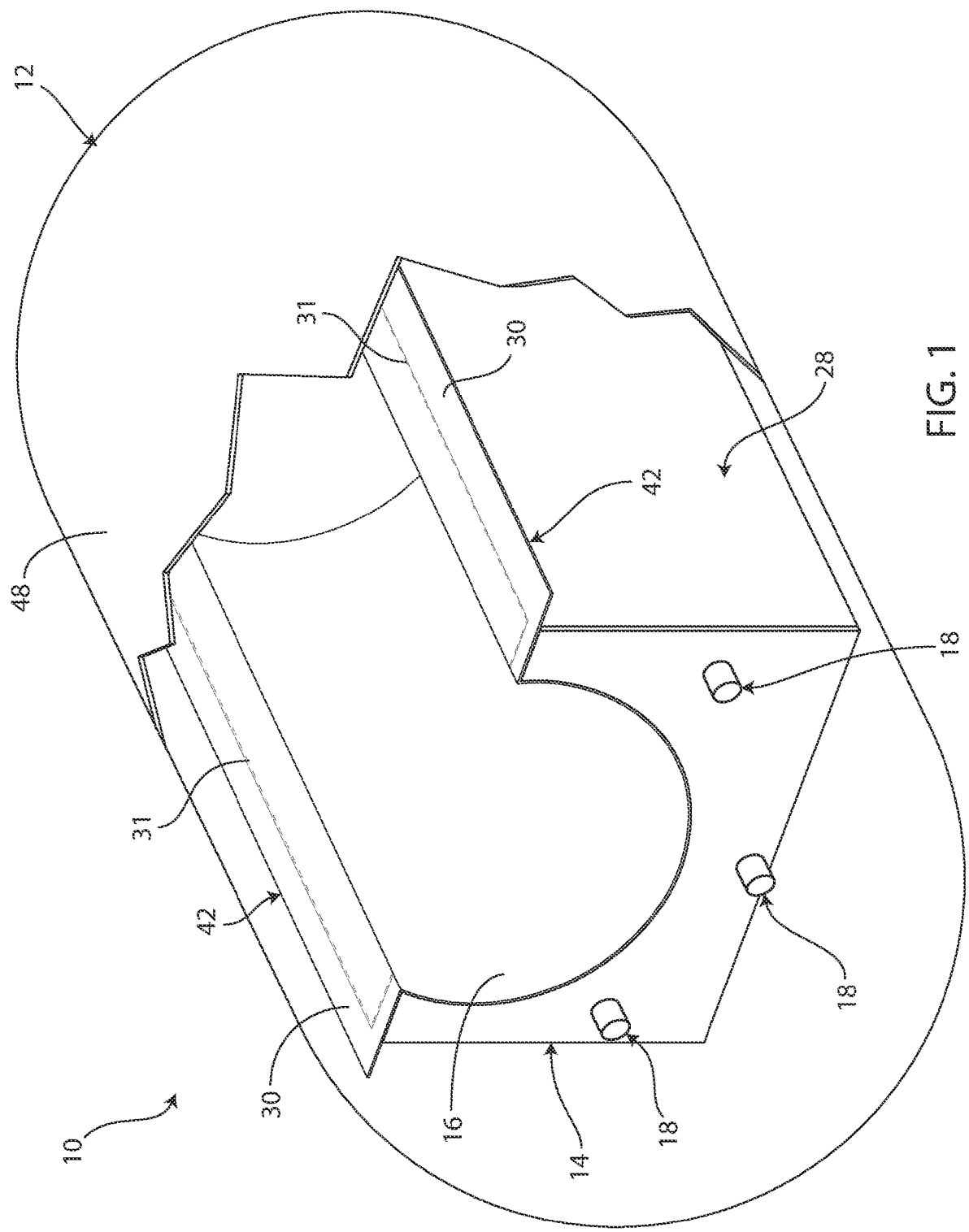
FIG. 1 is a partial perspective view of a system constructed in accordance with various embodiments of the present invention for manufacturing a composite part from composite materials, the system including a vessel with a front wall partially removed to reveal a heating tool.

A system 10 constructed in accordance with various aspects of the current invention for manufacturing complex composite parts is shown in FIG. 1. The system 10 may broadly comprise a vessel 12 mostly or fully enclosing a tool 14. The tool 14 includes a shaping surface 16 heated by heating elements 18.

Figure 3:
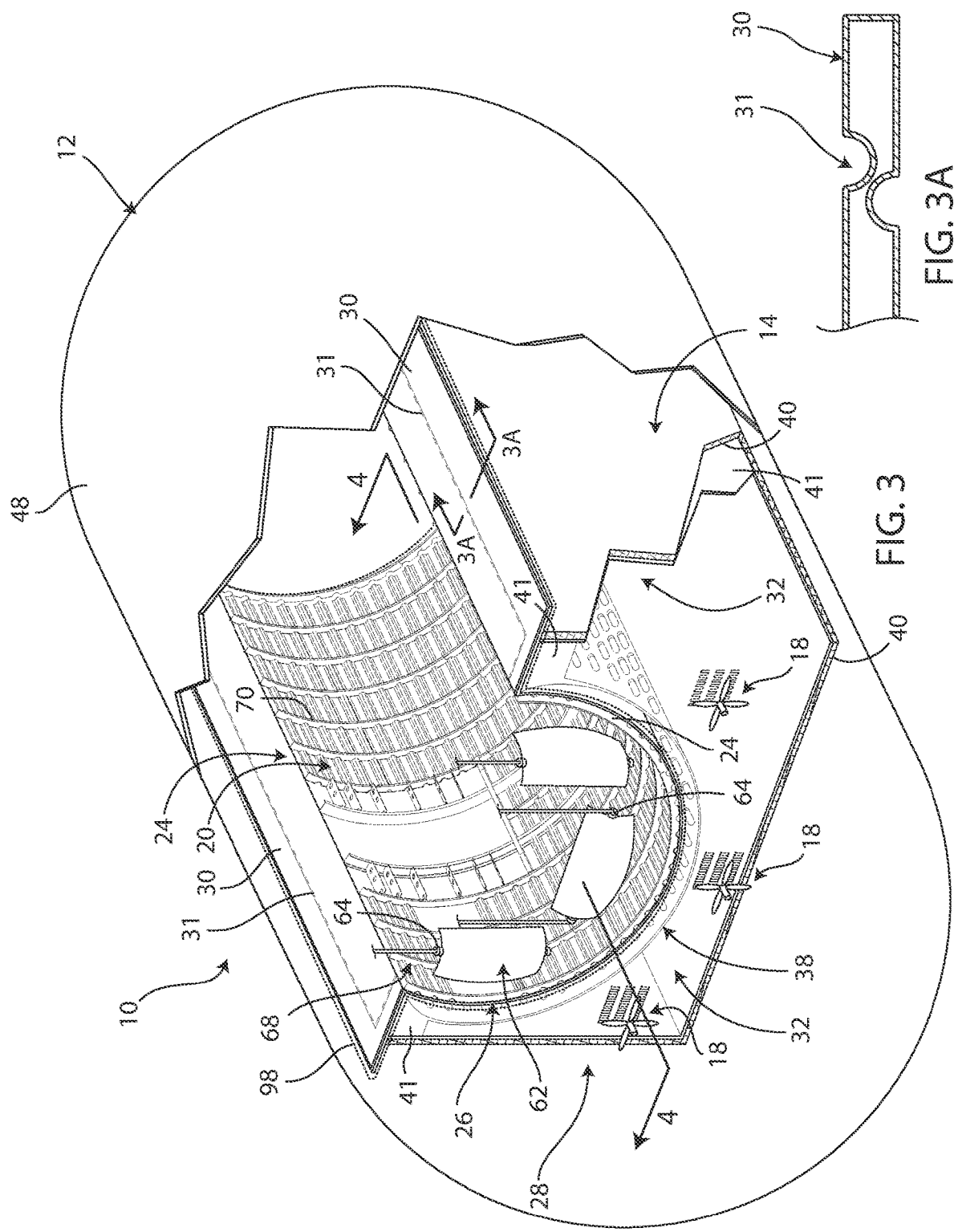
FIG. 3 is a partial perspective view of the system of FIG. 2, illustrating layering of additional components on a heating surface of the heating tool but excluding an insulation layer.

The shaping surface 16 may be constructed to form an outer mold line—such as the semi cylindrical outer mold line of FIG. 1—or another feature shape of a complex composite part to be manufactured. The complex composite parts manufactured with system 10 may include three-dimensional characteristics such as height, depth, curvature, contours, features that intersect at angles up to and including ninety degrees, or features that include a space between them. Such composite parts are often utilized in the manufacturing of aircraft, wherein various sections of an airplane, such as the wing, the tail, or the fuselage, may include dozens or hundreds of component pieces. An example of a composite part 20 that may be manufactured within the system 10 and using methods disclosed herein is a portion of an aircraft fuselage skin and substructure to be fused therewith, as shown in FIG. 3.

The tool 14 generally supports a portion of the composite material used to make the composite part 20. The tool 14 may be considered a layup tool, a welding or fusion tool, and/or a cure tool. In a preferred embodiment, the composite part 20 comprises thermoplastic polymers and the tool 14 is a welding or fusion tool for melting the thermoplastic polymers. Again, the tool 14 typically supports and is shaped to conform to the material that will define an outer mold line (OML) of the composite part 20, which may be defined by an outer margin of the composite part 20.

The exemplary tool 14 may include a platform 26 and a base 28. The platform 26 may comprise a facesheet or the like, and may include the shaping surface 16 upon which the composite material is placed and which has a complementary shape to the shape of the OML of the composite part 20. The platform 26 rests upon the base 28, which supports the weight of the platform 26, the composite part 20 and other components of the system 10 discussed below. The platform 26, including the shaping surface 16, may be manufactured from material that can withstand a curing or fusing process while conducting heat to the composite part 20, such as steel (e.g., A36 Steel), polyimide laminate, or the like.

Figure 2:
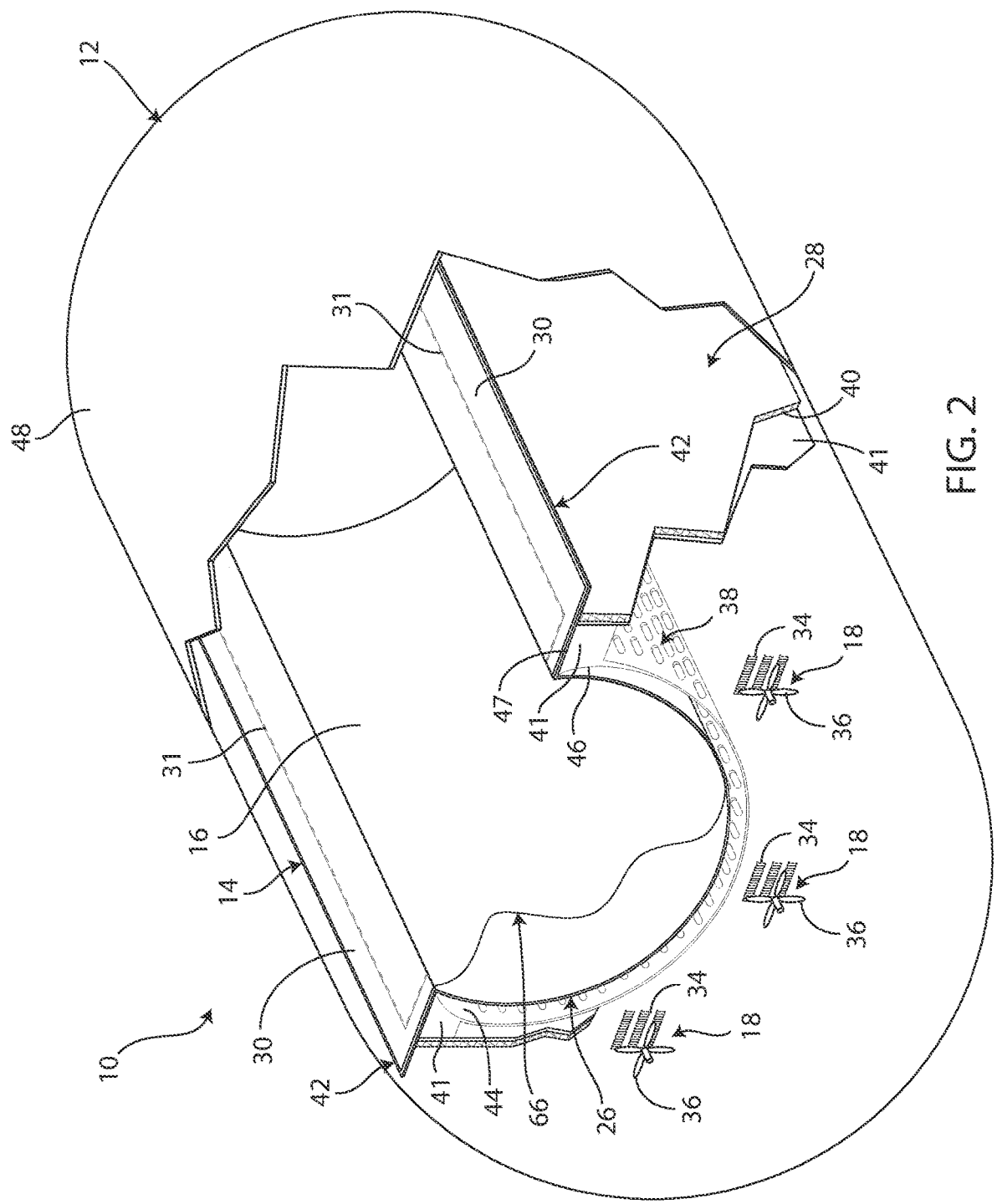
FIG. 2 is a partial perspective view of the system of FIG. 1, illustrating laying up of skin plies on the heating tool and having front and side walls of the heating tool partially removed to reveal heating elements and an internal chamber.

The base 28 may be comprised of the same or similar materials as the platform 26, or may be comprised of different rigid material capable of supporting the platform 26, the composite part 20 and other components of the system 10. Preferably, the tool 14 also includes surfaces 30 peripheral to the shaping surface 16 and the composite part 20 (when assembled). The peripheral surfaces 30 may be substantially planar and/or may extend orthogonally away from adjacent portions of the shaping surface 16 as illustrated in FIGS. 1-2. The peripheral surface 30 may be thermally isolated from the shaping surface 16 to reduce heat loss and avoid distortions associated with the different temperatures by creating a gap and thermal break filler (not shown). In another embodiment, the thermal isolation may be achieved by forming a thermal break 31 including a thinned transition region between the shaping surface 16 and peripheral surface 30 surrounded by laterally offset, opposite-facing semi cylindrical channels (see FIG. 3A) extending along the flanges 42 to minimize heat transfer while retaining vacuum integrity. The peripheral surfaces 30 may be configured for relatively rapid cooling, for example by presenting increased surface area for heat transfer and/or comprising less insulative material (as discussed in more detail below), through contact with a cooling fluid, or otherwise without departing from the spirit of the present invention.

Figure 4:
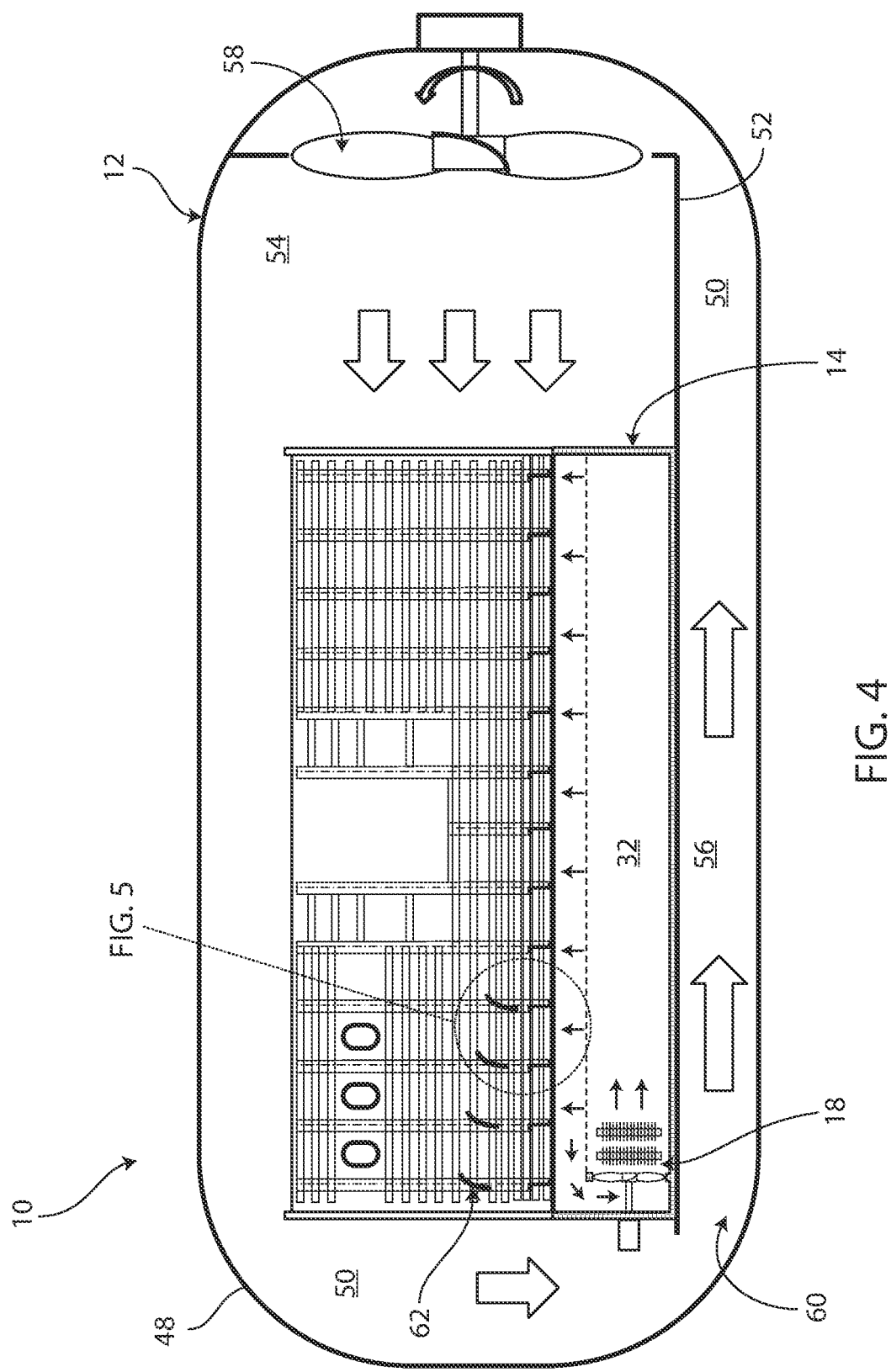
FIG. 4 is a schematized sectional side view of the system of FIG. 3, taken along line 4-4, illustrating simplified components to highlight heating and cooling flows.

Turning to FIG. 4, the heating elements 18 generally provide heat sources for the platform 26 to facilitate fusing the components of the composite material together and produce a finished composite part 20. The heating process may also—simultaneously and/or serially—consolidate layers or plies of components of the composite part 20 (such as skin, discussed in more detail below).

The heating elements 18 may be installed below and/or integrated within the platform 26. In the illustrated embodiment, the base 28 may define an internal chamber 32 immediately below the platform 26, and the heating elements 18 may comprise heated coils 34 fixed adjacent distribution fans 36 (see FIG. 2). The heated coils 34 may operate to generate heated air and the distribution fans 36 may push the heated air through the internal chamber 32 for convective heating of a bottom surface of the platform 26 and conductive heating of the shaping surface 16.

In a preferred embodiment, evenly distributed heating of the shaping surface 16 may be improved by interposing a perforated diffuser 38 between the heating elements 18 and the bottom surface of the platform 26 within the internal chamber 32. The perforated diffuser 38 may be shaped correspondingly to the bottom surface of the platform 26 and, in the illustrated embodiment, to the shaping surface 16 as well. The perforated diffuser 38 may comprise a sheet with regularly-spaced perforations therein for distributing the heated air more evenly over the bottom surface of the platform 26 and increasing a corresponding heat transfer coefficient of the tool 14. The perforated diffuser 38 may comprise steel, aluminum or other such materials known for use in heat diffusion.

One of ordinary skill will appreciate that various structure for evenly heating the shaping surface 16, including without limitation differently-shaped or constituted sheets of material, may be utilized or even omitted without departing from the spirit of the present invention. One of ordinary skill will also appreciate that alternative heating elements such as direct electric, joule heating, induction heating, oil heating, steam heating or the like may be utilized, and/or that an internal chamber may be omitted from a tool, within the scope of the present invention. Further, it is foreseen that thermocouples (not shown) may be spaced along the shaping surface 16 and/or platform 26 more generally for sensing temperature readings and reporting them back to a controller (also not shown) for increasing or decreasing output of the heating element(s) to achieve the desired temperature during fusing and/or consolidation processes.

The base 28 may also include insulation 40 for minimizing the loss of heat that would otherwise contribute to heating the shaping surface 16. The insulation 40 may present most or all outer surfaces of the base 28, and may substantially cover sidewalls 41 of the base 28. One of ordinary skill will appreciate that a tool insulation layer may comprise any of a variety of insulating materials, and that such an insulation layer may be omitted, without departing from the spirit of the present invention.

The tool 14 may also include flanges 42 that present the peripheral surfaces 30 and opposite underside surfaces (not shown). The flanges 42 may, for example, be less than or equal to 6.35 mm (0.25 inches) thick or, more preferably, may be 3.175 mm (0.125 inches), and may extend substantially orthogonally from adjacent portions of the shaping surface 16. The peripheral surfaces 30 preferably do not receive components of the composite part 20 during a fusing process. Moreover, the insulation 40 is preferably not applied over the outer portions of the peripheral surfaces 30, nor over the opposite underside surfaces, so that heat transfer away from the peripheral surfaces 30 may be increased (again, as discussed in more detail below), e.g., in instances where the tool 14 is cooled by surrounding air or other coolant fluid(s). According to embodiments of the present invention, peripheral surfaces 30 may be thermally isolated from shaping surface 16 by separation (e.g., where held in place by a thermally insulative material) or by creating a thermal break 31 between the shaping surface 16 and the peripheral surface 30 (see FIG. 3A and discussion above) thus minimizing the heat flow and shape distortion caused by thermal gradient(s) in combination with a non-zero thermal expansion coefficient. As noted above, the thermal break 31 may include a slip plane or a thin flexure area, which may provide relief of stresses caused by the differential expansion of the peripheral surface 30 and the shaping surface 16.

Additionally, the perforated diffuser 38 may curl from its otherwise constant and predominate curvature (e.g., in the shape of the OML) along opposite ends 44, 46 adjacent the flanges 42. More particularly, the opposite ends 44, 46 may curl inward to meet the platform 26. Preferably, thickened portions 47 of the sidewall 41 and/or insulation layer 40 extend across the resulting widened gap between the perforated diffuser 38 and peripheral segments of the base 28. In this manner, heat transfer between the heated air of the internal chamber 32 and the peripheral surfaces 30 may be reduced, thereby reducing the temperature along the peripheral surfaces 30 during a fusing process while maintaining sufficient temperatures along adjacent portions of the shaping surface 16. One of ordinary skill will appreciate that other configurations and/or structure may be utilized for cooling the peripheral surfaces within the scope of the present invention. For example, fins and/or heat sinks similar to heat sinks 90 disclosed elsewhere herein may be attached to and/or incorporated with the underside surfaces of the flanges 42 to enhance heat transfer to the coolant fluid within the scope of the present invention.

Turning to FIG. 4, a heating flow inside the tool 14—beginning with the heating elements 18 and circulating through the internal chamber 32—is illustrated from a side view. In addition, the vessel 12 is shown, and includes a wall 48 enclosing the tool 14 and defining a chamber 50.

The vessel 12 may comprise an autoclave, a bespoke pressure vessel, or any other enclosure capable of maintaining cooling fluid around the shaping surface 16 and, preferably, a sealed environment in which pressure may be varied from atmospheric. In an embodiment, the vessel 12 comprises an autoclave adapted for curing of standard thermosetting polymers, with a temperature rating of equal to or less than 204.444° C. (400° F.) and capable of generating and maintaining a pressure in the chamber 50 of at least 101.3529 kPa (14.7 pounds per square inch absolute (psia)). Preferably, the vessel 12 comprises an autoclave adapted for curing of standard thermosetting polymers, with a temperature rating of equal to or less than 204.444° C. (400° F.) and capable of generating and maintaining a pressure in the chamber 50 of at least 792.897 kPa (115 psia). It is foreseen that a vessel that is unsealed and/or that lacks pressure control—e.g., one that supplies cooling fluid at atmospheric pressure—may be utilized or that a vessel may be omitted entirely without departing from the spirit of the present invention.

The vessel 12 also includes a partition 52 within the wall 48 that supports the tool 14 within a main area 54 of the chamber 50 and delineates a coolant fluid return passage 56. The vessel 12 further includes an impeller 58 disposed within an opening in the partition 52. The impeller 58 receives coolant fluid from the return passage 56 and moves it toward and over the shaping surface 16 of the tool 14, the coolant flow then cycling back into the return passage 56 along the far or distal end of the chamber 50. More particularly, the partition 52 preferably extends substantially continuously toward and joins with sides of the wall 48, around the impeller 58 and beneath the tool 14, such that coolant fluid heated by the tool 14 during a fusing process and impeller operation only enters the return passage 56 at an entry 60 at the distal end of the chamber 50. Put another way, the coolant fluid preferably does not flow "upstream" around the impeller 58 or otherwise circumvent the flow pattern illustrated in FIG. 4.

The vessel 12 further includes vanes 62 suspended from a top of the wall 48. Preferably, a plurality of vanes 62 are arrayed radially along a single longitudinal segment of the tool 14 above the shaping surface 16. The vanes 62 may each be cupped or curved along a front face 63 configured to receive portions of the coolant fluid flow and redirect the coolant fluid into nooks between segments of the composite part 20 (see FIG. 5) and toward conductive heat sinks 90 (see discussion below). The redirection of coolant fluid into each nook may enhance transfer of heat away from portions of the composite part 20 that are in the nook, particularly from portions of the composite part 20 that are preferably not fused or melted during a fusing process (discussed in more detail below).

The plurality of vanes 62 may each be rotatably mounted in driving engagement with electric motors 64 configured to manually and/or automatically rotate the vanes 62 about respective axes of rotation to accommodate nooks and heat sinks 90 of varying longitudinal position. Preferably, the axes of rotation and front faces 63 of the vanes 62 are angled with respect to one another to ensure radial movement of the coolant air to cover a greater proportion of the nooks of the composite part 20 as the nooks extend circumferentially along the shaping surface 16. One of ordinary skill will appreciate that a variety of redirection tools, such as baffles, louvres, fins or the like, may be used within the scope of the present invention.

One of ordinary skill will further appreciate that additional heat transfer elements such as evaporator and/or chiller coils or the like may be positioned along the flow of coolant fluid (e.g., in the return passage 56) to remove heat from the coolant fluid within the scope of the present invention, for example as part of a cooling system that may release the heat removed from the coolant fluid to the ambient environment (e.g., surrounding or proximate the tool 14). Preferably, the mean coolant fluid temperature when released from the impeller 58 is at least 5° C. (9° F.) below that of the hottest portion of raised segment 77 of the substructure 68 (see below) during a steady-state fusing process. One of ordinary skill would appreciate, however, that temperature regulation of the coolant fluid may not be performed in embodiments of the present invention. It is also foreseen that various flow patterns—incorporating more or fewer delineated chambers and/or passages—may be utilized without departing from the spirit of the present invention.

Returning now to FIGS. 2-3, the composite part 20 may include skin 66 and substructure 68. The skin 66 may comprise a plurality of plies (see FIG. 2) laid up consecutively along and generally conforming to the shape of the shaping surface 16 and/or defining the OML, for example using automated fiber placement (AFP) or other known process for placing the plies. Again, the skin 66 may comprise thermoplastic composite.

The substructure 68 may also comprise thermoplastic composite and may be placed on the last ply of skin 66 opposite the shaping surface 16. The substructure 68 may comprise various three-dimensional structures designed to provide support against buckling for the skin 66, define and protect other features of the composite part 20 (such as windows or the like), and/or to perform other structure support/reinforcement functions. Exemplary structures include stringers 70, shear ties, window frames, intercostals, brackets, door surrounds, frames and/or the like. In each case, at least a portion of a structure may include a faying surface configured for placement against and fusing with a surface of the skin 66, as discussed in more detail below.

Figure 5:
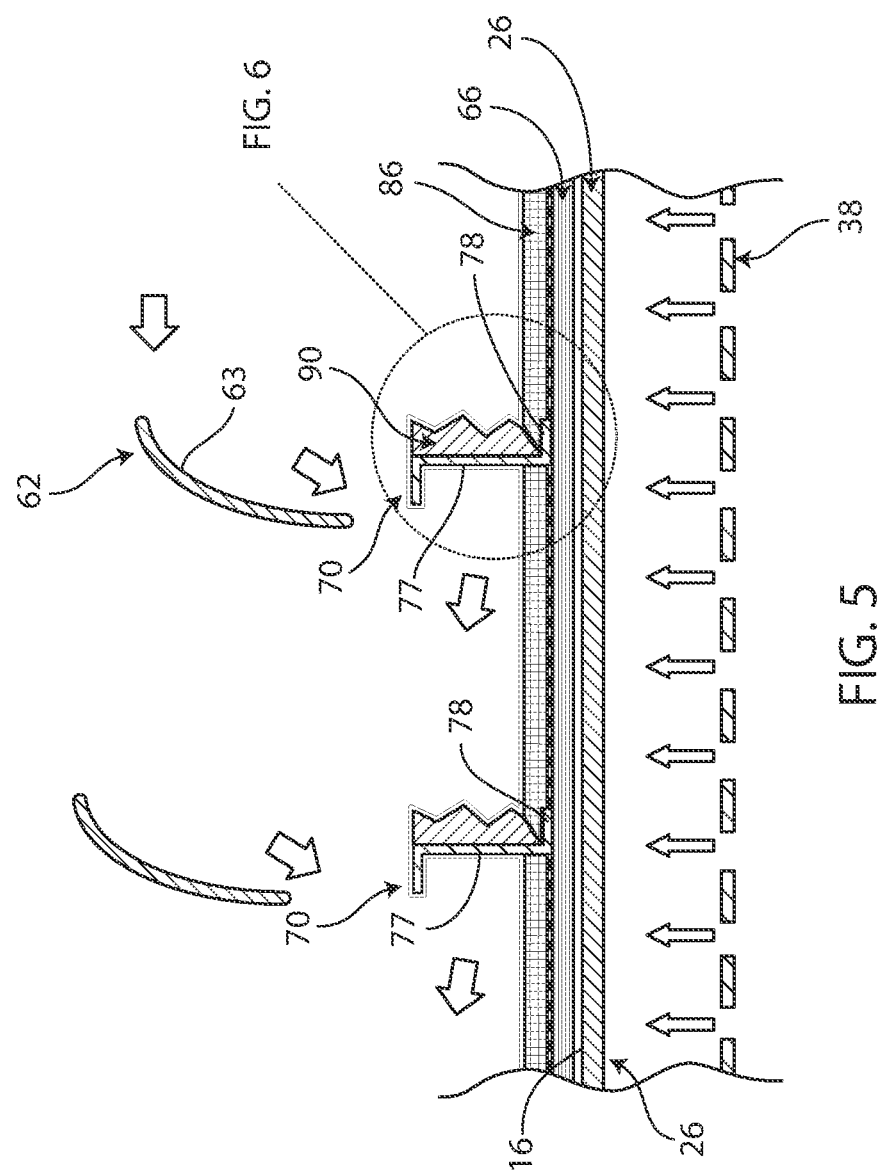
FIG. 5 is an enlarged view of a portion of the system of FIG. 4, illustrating layering of components on the heating surface of the heating tool during heating to fuse substructure to a skin.
Figure 6:
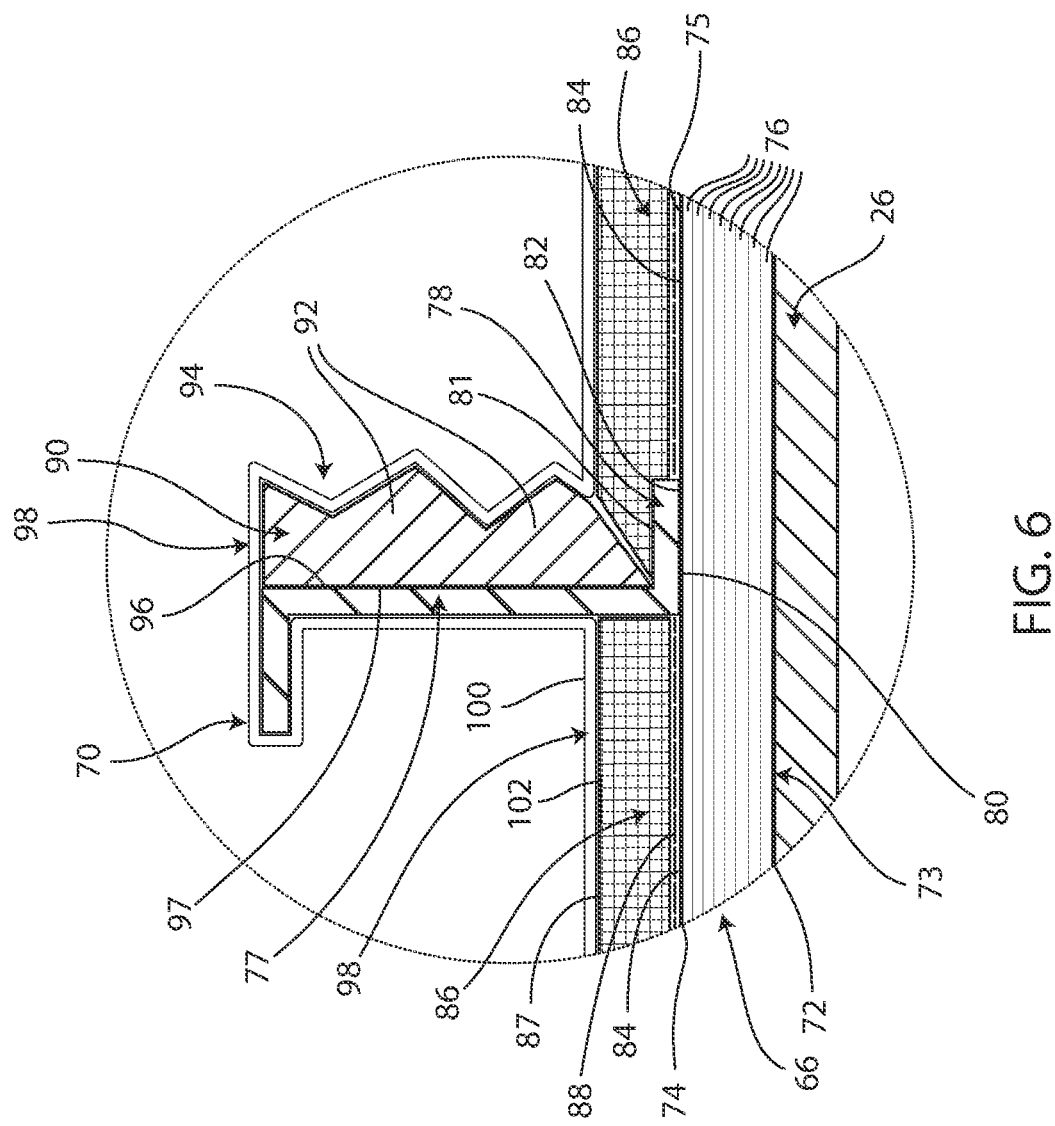
FIG. 6 is an enlarged partial view of the portion of the system of FIG. 5, illustrating further detail regarding the layering of components during heating to fuse the substructure to the skin.

Turning now to FIGS. 5-6, stringers 70 of the substructure 68 are illustrated in detail laid up against the upper ply of the skin 66. More particularly, the skin 66 includes an outer ply 72 presenting a first or outer side 73 of the skin 66. The skin 66 also includes an inner ply 74 presenting a second or inner side 75 of the skin 66. Between the outer and inner plies 72, 74 are a plurality of intermediate plies and adjacent plies with interlaminar regions of porosity 76 therebetween due to incomplete consolidation during initial layup or fiber placement (see FIG. 6).

The stringers 70 include raised segments 77 fixed to and/or integral with bottom flanges 78. The bottom flanges 78 present faying surfaces 80 and opposite surfaces 81. The faying surfaces 80 respectively contact complementary faying surfaces 82 presented by the inner side 75 of the skin 66. Outside the contact between the faying surfaces 80, 82 are exposed portions 84 of the inner side 75 of the skin 66 that are not contacted by substructure 68. As introduced above, one of ordinary skill will appreciate that substructure of a variety of shapes and functions, and faying surfaces of varying surface area, shape and contact profile against complementary skin faying surfaces, are within the scope of the present invention.

The preferred substructure 68 and skin 66 comprise thermoplastic polymer. The preferred tool 14 is configured to fuse the substructure 68 to the skin 66 together using uniform and steady-state heating applied through the shaping surface 16. More preferably, the tool 14 and system 10 are configured to apply air pressure greater than atmospheric pressure concurrently with the steady-state heating and fusing processes to consolidate the plies of the skin 66, as described in more detail below, to enhance structural integrity, fuse the plies together, conform the skin 66 to the shape of the shaping surface 16, and/or reduce the size of the interlaminar regions of porosity 76. However, it is foreseen that other than steady-state and/or uniform heating (e.g., differential heating) may be applied by a tool, that lesser or no pressure may be applied by a vessel (and that no vessel is required in some embodiments), and/or that consolidation processes may only partly overlap with or may not overlap with fusing of substructure to skin without departing from the spirit of the present invention. Moreover, one of ordinary skill will appreciate that curative or thermosetting composite materials may be utilized within the scope of the present invention, as described in more detail below.

The system 10 may also include an insulation layer 86 applied over the flanges 78 and exposed portions 84 of the skin 66. The insulation layer 86 may include an upper surface 87 opposite the shaping surface 16 when assembled thereto. The insulation layer 86 may include insulation blanket(s) or the like, which may comprise continuous filament polyester fiber, ceramic fiber, vermiculite, aerogel, glass bubbles, fiberglass and/or foams (e.g., polyimide) or the like within the scope of the present invention.

The insulation layer 86 may be engineered or designed—taking into account insulative properties such as coefficient of thermal conductivity—to varying thicknesses as it extends across varying portions of the composite part 20. In one or more embodiments, all or sections of the insulation layer 86 may be at least 2.54 mm (0.1 inches) thick under compression during curing and/or fusing process(es). More preferably, all or parts of the insulation layer 86 may be at least 5.08 mm (0.2 inches) thick under such compression. Still more preferably, all or parts of the insulation layer 86 may be at least 7.62 mm (0.3 inches) thick under such compression. Alternatively formulated, in one or more embodiments, all or sections of the insulation layer 86 may be at least 5.08 mm (0.2 inches) thick in a resting state (i.e., laid up and under ambient pressure prior to compression). More preferably, all or parts of the insulation layer 86 may be at least 10.16 mm (0.4 inches) thick in such a resting state. Still more preferably, all or parts of the insulation layer 86 may be at least 15.24 mm (0.6 inches) thick in such a resting state.

The insulation layer 86 may comprise a plurality of discontinuous panels or the like split, for example, by components of the substructure 68. In some embodiments, panels of the insulation layer 86 may be sized in accordance with desired spacing between respective components of the substructure 68 and/or between a component of the substructure 68 and a reference feature fixed with respect to the shaping surface 16 of the tool 14. For example, discontinuous panels of the insulation layer 86 may be laid out in this manner to establish correct positioning of the substructure 68 along the shaping surface 16 and/or desired separation between the components of the substructure 68. Moreover, such positioning may be maintained until consolidation is complete and/or until the components of the substructure 68 are fused to the skin 66.

If discontinuous panels of the insulation layer 86 are relied upon to establish or maintain the location of the components of the substructure 68, they may be specially engineered to maintain rigidity in-plane while optionally retaining flexibility out-of-plane. For example, each discontinuous panel of the insulation layer 86 may comprise an insulative layer and a thin metal layer, wherein the thin metal layer reinforces the periphery of the discontinuous panel without impeding its ability to flex out-of-plane. The discontinuous panels of the insulation layer 86 may also contain reinforced regions around their peripheries to support adjacent components of the substructure 68 and maintain normality or angular alignment of the components of the substructure 68 relative to the skin 66.

Figure 8:
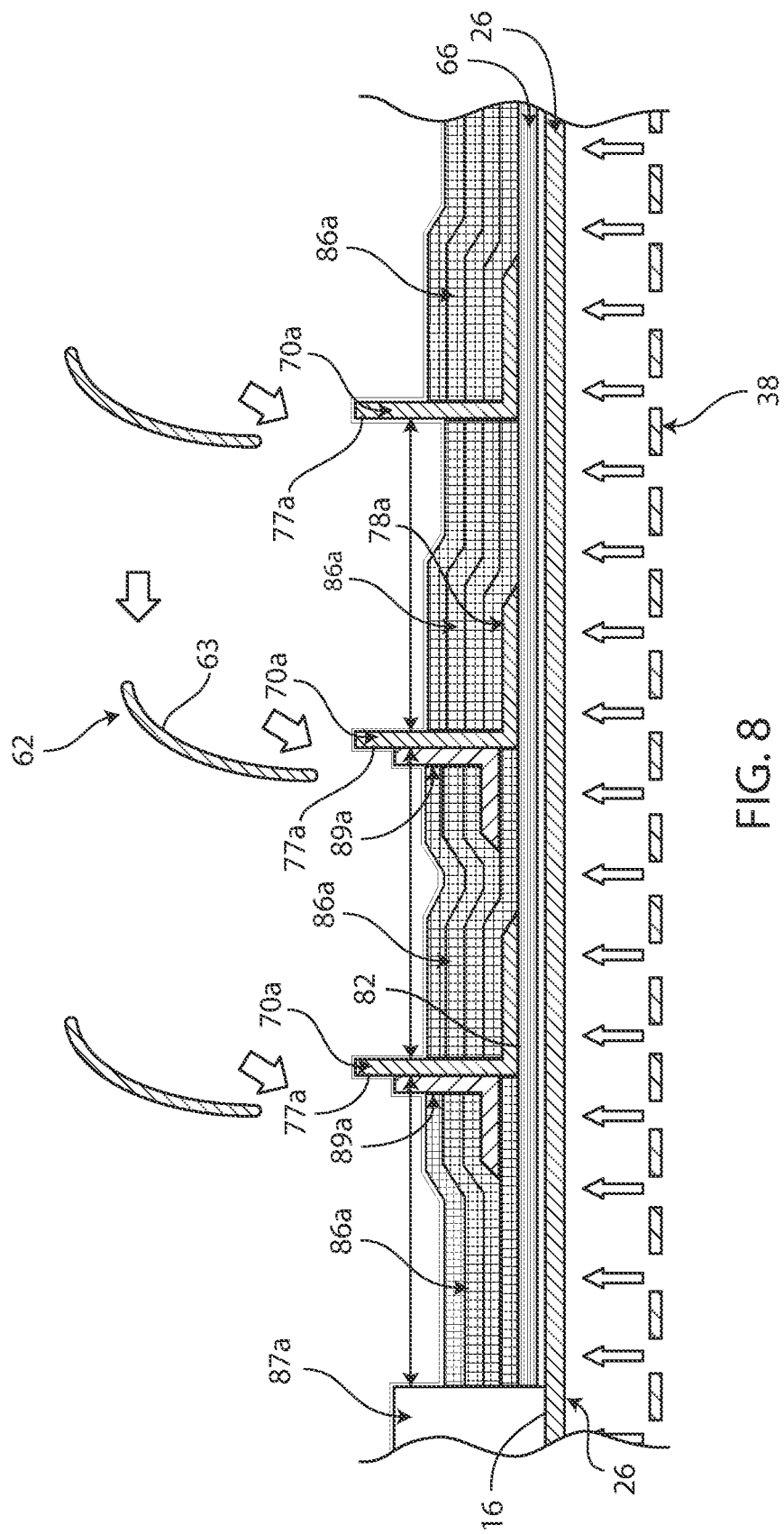
FIG. 8 is a partial, enlarged view of an alternative embodiment of the system of FIG. 4, illustrating insulation layers sized to control stringer spacing.

Turning briefly to FIG. 8, an enlarged view of an alternative embodiment of the system of FIG. 4 is provided. The illustrated components may be utilized within the broader system of FIG. 4, with the embodiment of FIG. 8: including discontinuous panels of an insulation layer 86*a* sized to control spacing of stringers 70*a*; including a reference feature 87*a* fixed to shaping surface 16; including alternatively-shaped stringers 70*a* supported by stiffener angle supports 89*a*; and omitting interposed conductive heat sinks (see component 90 discussed below).

More particularly, discontinuous panels of the layer 86*a* are sized in accordance with desired spacing between respective stringers 70*a* and between leftmost stringer 70*a* and the reference feature 87*a*. Moreover, at least some of the panels of the layer 86*a* include L-shaped stiffener angle supports 89*a*, each stiffener angle support 89*a* being positioned opposite and extending away from a flange 78*a* of an abutting stringer 70*a*. Each L-shaped stiffener angle support 89*a* may provide support to resist unwanted separation of the flange 78*a* from the underlying faying surface 82 during curing and/or fusing process(es). Stiffener angle supports 89*a* may comprise aluminum or other known conductive heat sink material of sufficient rigidity to maintain the desired upright position of supported components of the substructure 68.

Each portion of the insulation layer 86 may be engineered with reference to desired function. Preferably, portions of the insulation layer 86 overlying exposed portions 84 of the skin 66 are configured to facilitate fusing and consolidation of all the plies of the skin 66 during the heating process (preferably steady-state and uniform across the shaping surface 16). In contrast, portions of the insulation layer 86 overlying flanges 78 and similar portions of the substructure 68 presenting faying surfaces are preferably configured by taking into account the insulating value of the flanges 78 themselves (for example) and with a view to facilitating the above-referenced fusing and consolidation of the underlying plies of the skin 66, as well as fusing the faying surfaces 80 to the faying surfaces 82 while maintaining the opposite surfaces 81 of the flanges 78 below melting point. The insulation layer 86 may therefore be thinner in segments overlying flanges 78 and thicker in segments overlying exposed portions 84 of the skin 66. In the illustrated embodiment (see FIGS. 5-6) the insulation layer 86 tapers as it approaches a transitional bend between the flange 78 and the raised segment 77.

Preferably, the application of heat to the shaping surface 16 and the insulation layer 86 are sufficiently controlled so that fusing and consolidation processes may be completed without melting the opposite surfaces 81 of the flanges 78, or any portions of the raised segments 77 of the substructure 68. Also or alternatively, the system 10 may include a release layer 88 between the exposed portions 84 of the skin 66 and the insulation layer 86 to prevent or reduce adhesion therebetween. The release layer 88 may also extend between opposite surfaces 81 of the flanges 78 (and analogous surfaces of the substructure 68) and the insulation layer 86. The release layer 88 may comprise a nonstick release film (e.g., Polytetrafluoroethylene, fluorinated ethylene propylene (FEP) or another fluoropolymer, released metal foil, released polyimide film, coated woven glass fabric, etc.) or the like.

Further, to facilitate heat transfer away from the raised segments 77 of the substructure 68, the system 10 may include a conductive heat sink 90 temporarily applied against each raised segment 77 during the heating process. The conductive heat sink 90 may comprise aluminum or other known conductive heat sink material, and may include ridges 92 (and/or other such discontinuities such as ribs or corrugations) along a first side 94 opposite a second side 96. The ridges 92 may increase the surface area for heat transfer away from the raised segments 77. The first side 94 may be oriented to face the flow of coolant fluid from the impeller 58 to further enhance heat transfer. The second side 96 may conform to the shape of a corresponding outer surface 97 of the raised segment 77 against which it is held—in the illustrated example, that shape being substantially flat or planar—to optimize conductive heat transfer from the raised segment 77. Each conductive heat sink 90 may be held against the corresponding outer surface 97 by air pressure applied against the heat sink 90 via the impermeable bag 98 during fusing or heating processes or by other known means such as fasteners or the like. One of ordinary skill will appreciate that other structures may be placed along raised segments for enhanced heat transfer, and that such structures may be omitted, without departing from the spirit of the present invention.

Air pressure or pressurized coolant fluid may be applied during heating by the vessel 12 (e.g., an autoclave) in order to hold the composite part 20 in place, improve fusing of the faying surfaces 80, 82, and/or improve consolidation of the plies of skin 66. The system 10 may include a vacuum bag 98 covering the composite part 20 such that the composite part 20 is enclosed by the combination of the vacuum bag 98 and the shaping surface 16 of the tool 14. The vacuum bag 98 is generally manufactured from a flexible and resilient material such as cured silicone rubber, nylon, polyurethane and/or fiber-reinforced versions of the foregoing (or other similar materials) that allows the vacuum bag 98 to adapt to curvatures and contours of the part 20 and the platform 26. In addition, the vacuum bag 98 may be reusable in that the bag may be used repeatedly to manufacture a plurality of composite parts.

The vacuum bag 98 may include an upper sheet surface 100 and a lower sheet surface 102. The flexible material of the vacuum bag 98 may be substantially or completely impermeable to the atmosphere and/or other gases that may be used as coolant fluid (see below). Preferably, the flexible material of the vacuum bag 98 is impermeable to atmosphere at a pressure differential of 103.421 kPa (15 psi). More preferably, the flexible material of the vacuum bag 98 is impermeable to atmosphere at a pressure differential of 689.476 kPa (100 psi) or greater.

It should also be noted that it is preferable for the vacuum bag 98 to be smoothly distributed across and pressing squarely down upon the composite part 20 to optimize pressure supplied during consolidation processes (i.e., minimal bridging at interfaces with underlying structure). Preferably, the vacuum bag 98 makes direct contact with such underlying structure. However, the shapes of the substructure 68 may substantially restrict entry of the vacuum bag 98 into certain areas above exposed portions 84 of the skin 66. For instance, the lower left-hand corner of the flange 81 (see FIG. 6) may, in some embodiments, be curved (not shown), resulting in a pocket (not shown) beneath the curved portion of the flange 81 that a vacuum bag 98 is unlikely to fill properly. The skin 66 below such a pocket may—in the absence of direct pressure applied by the vacuum bag 98 during a consolidation and/or heating process—experience reduced consolidation. To reestablish direct contact with the vacuum bag 98 for proper consolidation, the pocket may be filled with a radius filler or the like, preferably comprising the same or similar material as the composite part 20. Alternatively the heat sink 90 may be placed to engage the pocket and transfer the consolidation pressure.

The vacuum bag 98 may also extend beyond the outer periphery of the composite part 20 to seal against the tool 14 and maintain compression pressure on the composite part 20 against the shaping surface 16.

Returning to FIG. 3, the vacuum bag 98 may more particularly seal against the peripheral surfaces 30 and other surfaces of the platform 26 immediately surrounding the periphery of the composite part 20. As outlined above, the peripheral surfaces 30 are preferably configured (e.g., utilizing thinned flanges, increased surface area exposed to coolant fluid, lack of insulation, and/or other design factors) to be maintained at a temperature below a melting or decomposition temperature of the vacuum bag 98 during the fusing and consolidation processes. This may prevent or reduce melting or decomposition of the vacuum bag 98 and/or adhesion of the vacuum bag 98 to the peripheral surfaces 30, ensuring the reusability of the bag 98 and the integrity of the manufacturing process. With proper engineering, cheaper vacuum bags and sealant tape having lower melt temperatures which are more user friendly may be utilized, which is an advantage of embodiments of the present invention.

Also or alternatively, surfaces of the platform 26 and/or tool 14 more generally that immediately surround the periphery of the composite part 20—and against which peripheral portions of the vacuum bag 98 seal—may be covered in an insulation layer or similar material reducing or preventing heat transfer between the vacuum bag 98 and the tool 14 during and/or following the fusing process to further enable low melt temperature bagging materials.

Similarly, the insulation layer 86, a heating rate applied to the shaping surface 16 and/or other design considerations may be engineered to ensure no portion of the vacuum bag 98—including those portions contacting the raised segments 77, the platform 26, the conductive heat sinks 90, and/or the insulation layer 86—touches a surface above the melting temperature of the vacuum bag 98.

As a particular example, the raised segments 77 may comprise thermoplastic polymer composite material and may have a through-thickness R-value at each location on a surface thereof (e.g., as determined through the thickness along a line perpendicular to the surface at the location of the raised segment 77). Each raised segment 77 (see FIGS. 5-6) is preferably left without insulation during the fusing and consolidation processes. Preferably no material is interposed between the vacuum bag 98 and the raised segment 77 wherein the through-thickness R-value of the interposed material at any location is more than one thousand (1000)

times the through thickness R-value of the raised segment 77 at a corresponding adjacent location. More preferably no material is interposed between the vacuum bag 98 and the raised segment 77 wherein the through-thickness R-value of the interposed material at any location is more than one hundred (100) times the through thickness R-value of the raised segment 77 at a corresponding adjacent location. Still more preferably no material is interposed between the vacuum bag 98 and the raised segment 77 wherein the through-thickness R-value of the interposed material at any location is greater than ten (10) times the through thickness R-value of the raised segment 77 at a corresponding adjacent location. In another formulation, the vacuum bag 98 is preferably in direct contact with the raised segment 77 and/or a conductive heat sink 90 which, itself, is conductively receiving heat through direct contact with the raised segment 77. In another formulation, the vacuum bag 98 is preferably separated from the raised segment 77 and/or a conductive heat sink 90 only by polymer or metallic film or films totaling no more than 1.5875 mm (0.0625 inches) in thickness. In yet another formulation, the vacuum bag 98 is preferably separated from the raised segment 77 and/or a conductive heat sink 90 only by polymer or metallic film or films totaling no more than 0.7874 mm (0.031 inches) thickness.

In still yet another formulation, a contact surface portion of the first side of the vacuum bag 98 is in direct contact with an underlying surface either of the raised segment 77 (e.g., with a portion of the outer surface of the raised segment 77a of FIG. 8) or of a non-insulative material interposed between the first side of the vacuum bag 98 and the raised segment 77 (e.g., with a portion of the first side 94 of the conductive heat sink 90 of FIG. 6).

The raised segment 77 has a through-thickness R-value taken along a line perpendicular to the contact surface. In embodiments that include the non-insulative interposed material, the interposed material has a through-thickness R-value, taken along the line, that is less than one thousand (1000) times the through thickness R-value of the raised segment 77 taken along the line. More preferably, in embodiments that include the non-insulative interposed material, the interposed material has a through-thickness R-value, taken along the line, that is less than one hundred (100) times the through thickness R-value of the raised segment 77 taken along the line. Still more preferably, in embodiments that include the non-insulative interposed material, the interposed material has a through-thickness R-value, taken along the line, that is less than ten (10) times the through thickness R-value of the raised segment 77 taken along the line.

In this manner, embodiments of the present invention ensure that the vacuum bag 98 does not melt and/or otherwise adhere to adjacent components of the system 10. One of ordinary skill will appreciate that substructure incorporating certain raised segments that are to be fused to other composite materials—and, therefore, may themselves be insulated to facilitate melting and fusing—are also within the scope of the present invention.

It should be noted that R-value is used herein to mean thermal resistance per unit area in the general sense, and not as a reference to any particular system of units. Therefore, any system of units and/or test method known in the art may be used to compare the R-values of the relevant elements discussed herein. R-value is a measure of how well an object resists the conductive flow of heat, which is dependent on both the thermal conductivity property of the material from which the object is composed and the thickness of the object at the location where the R-value measurement is taken. It is possible to determine an object's R-value at a given location directly, in accordance with established international standards, e.g. according to the method of ASTM® C518-17 Standard Test Method for Steady-State Thermal Transmission Properties by Means of the Heat Flow Meter Apparatus. It is also possible to calculate an object's R-value at a given location knowing both its thickness at such location and the thermal conductivity (K-value) of the material comprising the object according to the following equation: R-value=1/(K-value/Thickness). Thermal conductivity coefficients or K-values outlined herein may also be determined using established international standards, including ASTM® C177-19 Standard Test Method for Steady-State Heat Flux Measurements and Thermal Transmission Properties by Means of the Guarded-Hot-Plate Apparatus. References to ASTM® standards are as propagated by the American Society for Testing and Materials Corporation as of the initial filing date of this disclosure.

The system 10 may include additional components such as a pressure source configured to provide compression pressures during the curing and/or fusing process(es), a source of resin (e.g., where thermosetting composites are used), and/or other equipment configured to provide matrix material and/or lay up skin on the tool via automated fiber placement (AFP) during the laying up process (as discussed below), without departing from the spirit of the present invention.

Figure 7:
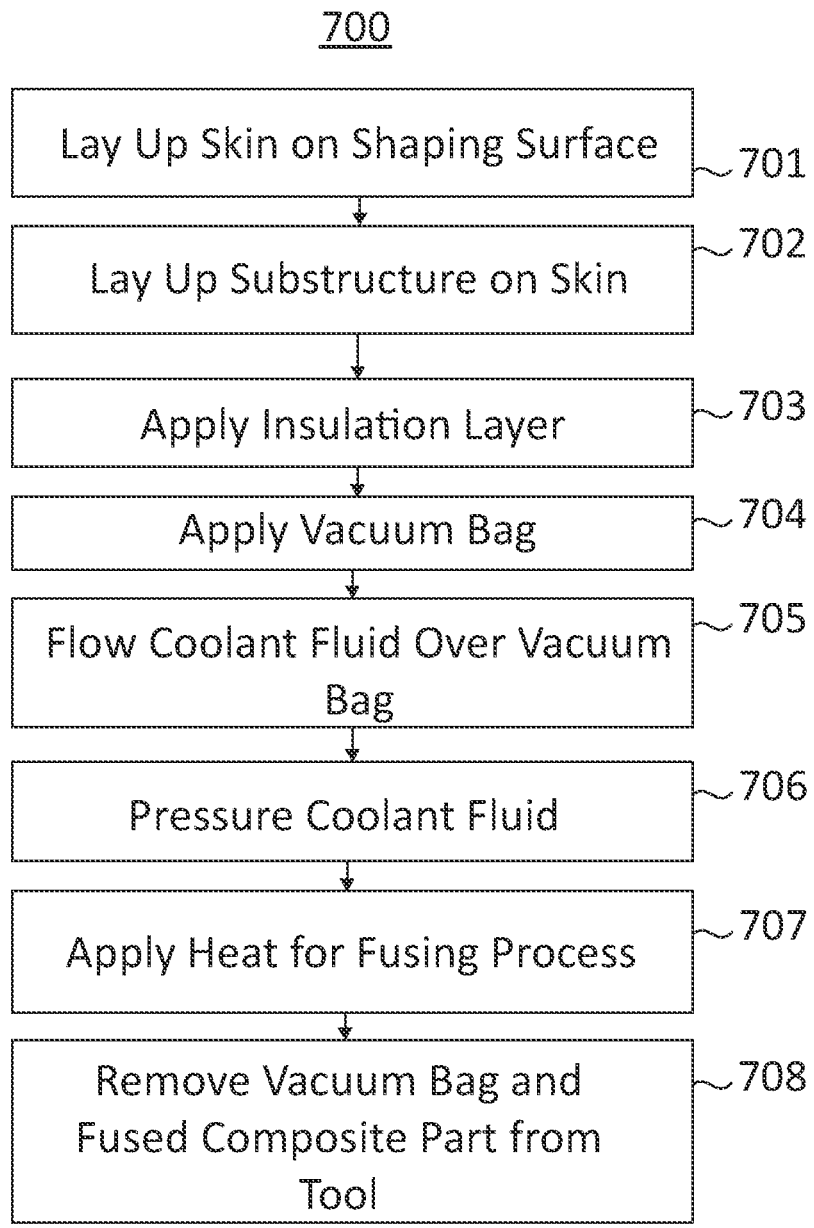
FIG. 7 illustrates at least a portion of the steps of an exemplary method for manufacturing a composite part from composite material according to an embodiment of the present invention.

At least a portion of the steps of a method 700 for manufacturing a composite part from a composite material using the system 10 in accordance with various embodiments of the present invention is listed in FIG. 7. The steps may be performed in the order as shown in FIG. 7, or they may be performed in a different order. Further, some steps may be performed concurrently as opposed to sequentially. In addition, some steps may be omitted. Still further, embodiments of the present invention may be performed using systems other than system 10 without departing from the spirit of the present invention.

In connection with step 701, a skin may be laid up on a shaping surface of a tool. The skin may include an outer surface and an inner surface, and the shaping surface of the tool may be configured to maintain the outer surface of the skin in a shape of an outer mold line. Further, the inner surface of the skin may have a first faying surface.

The tool may include a base having a sidewall covered by a tool insulation layer. The tool may also have at least one cooling portion—also referred to herein as a "cooled portion"—that includes an outer surface that receives perimeter or peripheral portions of a vacuum bag (see discussion below). The cooling portion may be sufficiently thin or otherwise configured so as to maintain each outer surface below a melting point of the vacuum bag during fusing of the substructure to the skin (again, see discussion below).

Laying up the skin may include layering multiple plies consecutively on top of one another. Advantageously, embodiments of the present invention may permit layering the plies without the need for intervening heating and/or rolling steps commonly associated with such layup processes. That is, typical AFP processes will heat and/or roll plies during a layup process in order to at least partly consolidate layers prior to fusing skin to substructure. Embodiments of the present invention may reduce or omit such heating and/or rolling steps, and instead perform much or all of the consolidation process concurrently with the fusing process.

In connection with step 702, a substructure may be laid up on the inner surface of the skin. The substructure may include an outer margin which, like the skin, may be formed to the shape of the outer mold line by the support of the shaping surface of the tool. The substructure may include a flange and a raised segment fixed to and/or integral with the flange. The flange may include a second faying surface. The second faying surface of the substructure may be laid against and in contact with the first faying surface of the skin. Areas outside of the second faying surface (i.e., those not in contact with the substructure) may be considered exposed portions of the inner surface of the skin.

Further, embodiments of the present invention may include placing a conductive heat sink between the raised segment of the substructure and the vacuum bag and maintaining the placement of the heat sink during fusing of the substructure to the skin.

Still further, the raised segment may comprise thermoplastic polymer composite material and may have a through-thickness R-value at each location thereon. The method may include ensuring that no material is placed between the vacuum bag and the raised segment wherein the through-thickness R-value of such material at any location is more than one thousand (1000) times the through thickness R-value of the raised segment at a corresponding adjacent location. The method may include ensuring that no material is placed between the vacuum bag and the raised segment wherein the through-thickness R-value of such material at any location is more than one hundred (100) times the through thickness R-value of the raised segment at a corresponding adjacent location. The method may include ensuring that no material is placed between the vacuum bag and the raised segment wherein the through-thickness R-value of such material at any location is greater than ten (10) times the through thickness R-value of the raised segment at a corresponding adjacent location (see discussion below).

Yet still further, a release layer may be applied along the exposed portion of the inner surface of the skin. The release layer may comprise Polytetrafluoroethylene or other materials outlined above.

In connection with step 703, at least one insulation layer may be applied over the flange of the substructure and over exposed portions of the inner surface of the skin not in contact with the substructure. The insulation layer may be sized and may consist of sufficient insulative materials so that application of heat to the shaping surface (during the fusing process described below) causes each of the plurality of composite layers of the skin to fuse with adjacent ones of the plurality of composite layers during the fusing of the substructure to the skin. In addition, the insulation layer may be sized and may consist of sufficient insulative materials so that the application of heat to the shaping surface during the fusing process causes the second faying surface and the first faying surface to melt and fuse with one another, joining the skin to the substructure.

Moreover, with reference to FIG. 8, discontinuous panels of the insulation layer may be consecutively laid—e.g. beginning at a reference feature of the shaping surface and proceeding along the shaping surface—between components of the substructure. Laying of the insulation panels may occur concurrently with laying of the substructure and/or positioning of the components of the substructure may be adjusted as the insulation panels are laid up to establish a desired separation therebetween. As noted above, the insulation panels may include stiffener angle supports for maintaining the upright position of components of the substructure during curing and/or fusing process(es).

As discussed below, one of ordinary skill will appreciate that thermosetting materials may be used with embodiments of the present invention, and the insulation may be engineered, for example, with the goal of achieving curing temperatures (rather than melting/fusing temperatures), for example for thermosetting materials and/or adhesives, without departing from the spirit of the present invention. One of ordinary skill will also appreciate that such other embodiments may include additional steps, for example injecting or infusing matrix material where prepreg reinforcement material is not used. Such other steps are known for use in constructing composite parts and are therefore not described in detail herein.

In connection with step 704, a vacuum bag may be applied to cover the skin and the substructure such that the skin and the substructure are at least partly and preferably fully enclosed by the combination of the vacuum bag and the shaping surface of the tool. The vacuum bag comprises material having a melting point above the temperature of the coolant fluid. It should be noted that nominal changes in melting point with variation in coolant fluid pressure are disregarded for purposes of this disclosure.

Further, as noted above, the vacuum bag may include a first side adjacent the composite part and a second side opposite the first side. The insulation layer may include a first side adjacent the substructure and a second (or upper) side opposite the first side. Still further, each of the raised segment and the flange may include an outer surface. A first portion of the insulation layer may cover the outer surface of the flange over the faying surfaces, and a second portion of the insulation layer may cover the exposed portion of the second side of the skin. Yet still further, the insulation layer may be sized such that, during the fusing of the substructure to the skin (discussed below), the second side of the insulation layer and a portion of the first side of the vacuum bag covering the raised segment are each maintained below the melting point of the vacuum bag.

In connection with step 705, a coolant fluid may be continuously flowed into contact with and over the second side of the vacuum bag. The flow may be maintained throughout most or all of the fusing process outlined below. Preferably, the coolant fluid is maintained at a lower temperature than that of the composite part. Also or alternatively, the coolant fluid may be maintained at a lower temperature than that of each of the raised segments that are fixed to faying surfaces of the substructure and/or at a lower temperature than that of the skin. The coolant fluid flow may be applied against the second side of the vacuum bag at least in part by an impeller and a vane, the vane being shaped and positioned to receive the flow of coolant fluid from the impeller and redirect the flow of the coolant fluid toward the vacuum bag.

In connection with step 706, the coolant fluid may be pressurized. The pressurization may be achieved using a vessel comprising an autoclave or the like. It is foreseen that atmospheric pressure (e.g., at sea level) may provide sufficient pressure on the vacuum bag without departing from the spirit of the present invention. The pressure of the coolant fluid may be at or above 101.3529 kPa (14.7 psia) or, more preferably, at or above 689.476 kPa (100 psia), and may be maintained at substantially the same pressure during the fusing of the substructure to the skin (discussed in more detail below).

In connection with step 707, heat may be applied to the shaping surface to fuse the substructure to the skin by melting along the first and second faying surfaces. As noted above, thermocouples may be embedded along a platform of the tool to provide temperature sensing feedback to a controller. The controller may control the output of one or more heating elements to provide uniform and steady-state heating (preferably) or differential heating to the shaping surface for fusing of the substructure to the skin and concurrent consolidation of the plies of the skin.

In connection with step 708, the vacuum bag and fused composite part may be removed from the tool. The coolant fluid may be depressurized and the flow may be halted in connection with such removal.

As depicted in FIG. 9, an alternative system 110 for forming a composite part with a substructure joined therewith is disclosed in detail below. This alternative system 110 can be used in place of overmolding for joining an injection molded, 3D printed, and/or extruded substructure to the skin, and advantageously does not require the skin to be in a press nor to be consolidated prior to the fusion described herein. Generally, a thin layer of conductive foil or other such metal formed to portions of the thermoplastic substructure is sufficient to prevent the composite part from suffering excessive deformation during the melt process, at least under vacuum conditions.

Specifically, as disclosed in FIG. 9, a tool 114 can include a shaping surface 116, both of which are identical or substantially identical to the tool 14 and the shaping surface 16 described above. The tool 114 can also be heated via heating elements (not shown), such as the heating elements 18 described in other embodiments above. A composite part 120 formed on the shaping surface 116 may include skin 166 (e.g., thermoplastic composite skin or other such skins identical or substantially identical to the skin 66 described above) and a substructure 168. The substructure 168 may differ from the substructure 68 described above in that the substructure 168 may be a thermoplastic component made by injection molding or other molding processes, 3D printing, and/or extrusion. For example, the substructure 168 may be a thermoplastic component without any prepreg fiber or reinforcement material such as those used in the skin 166. The phrase "molding processes" as used herein may cover any one or more of: injection molding, extrusion, casting, compression molding, blow molding, rotomolding, transfer molding and thermoforming. However, other molding processes may be used without departing from the scope of the technology described herein. The skin 166 may comprise a plurality of plies stacked or laid up consecutively along and generally conforming to the shape of the shaping surface 116 and/or defining the OML, for example using automated fiber placement (AFP) or other known process for placing the plies. The skin 166 may comprise thermoplastic composite material or laminates having any combination of fiber orientations.

The substructure 168 may be a thermoplastic polymer formed into a thermoplastic part via a molding process, 3D printing, and/or extrusion. After its initial formation, the substructure 168 may be placed on the last ply of skin 166 opposite the shaping surface 116. The substructure 168 may comprise various three-dimensional structures designed to provide support against buckling for the skin 166, to define and protect other features of the composite part (such as windows or the like), and/or to perform other structure support/reinforcement functions. Exemplary structures include stringers, shear ties, window frames, intercostals, brackets, door surrounds, frames and/or the like. In each case, at least a portion of the substructure 168 may include a faying surface configured for placement against and fusing with a surface of the skin 166, as discussed in more detail below.

Turning again to FIG. 9, the substructure 168 is illustrated in detail laid up against the upper ply of the skin 166. More particularly, the skin 166 includes an outer ply presenting a first or outer side of the skin 166. The skin 166 also includes an inner ply presenting a second or inner side of the skin 166. Between the outer and inner plies there may be a plurality of intermediate plies and adjacent plies with interlaminar regions of porosity therebetween due to incomplete consolidation during initial layup or fiber placement.

The substructure 168 may include at least one raised segment 177 fixed to and/or integral with a base 178. The base 178 may present a faying surface and additionally may, in some embodiments, comprise one or more opposite surfaces or non-faying surfaces. The faying surface of the substructure may contact complementary faying surfaces presented by the inner side of the skin 166. Outside the contact between the faying surfaces of the substructure 168 and the skin 166, the inner side of the skin 166 may have exposed portions 184 that are not contacted by substructure 168. As introduced above, one of ordinary skill will appreciate that substructures of a variety of shapes and functions, and faying surfaces of varying surface area, shape and contact profile against complementary skin faying surfaces, are within the scope of the technology described herein. Furthermore, one of ordinary skill will appreciate that while only one substructure 168 is depicted in FIG. 9, spaced out multiples of the substructure 168 or other substructures described herein may also be included in the composite part and may have the exposed portions 184 located therebetween, similar to the stringers placed in spaced relationship on the skin in FIGS. 3-5, without departing from the scope of the technology described herein.

The preferred substructure 168 and skin 166 may comprise thermoplastic polymer, as noted in various places herein. The preferred tool 114 may be configured to fuse the thermoplastic polymer of the substructure 168 to that of the skin 166 together using uniform and steady-state heating applied through a shaping surface 116 (identical or substantially identical to the shaping surface 16). More preferably, the tool 114 and system 110 may be configured to apply air pressure (e.g., a pressure differential via a vacuum bag) greater than atmospheric pressure concurrently with the steady-state heating and fusing processes to consolidate the plies of the skin 166, as described above in reference to the skin 66, to enhance structural integrity, fuse the plies together, conform the skin 166 to the shape of the shaping surface 116, and/or reduce the size of the interlaminar regions of porosity. However, it is foreseen that other than steady-state and/or uniform heating (e.g., differential heating) may be applied by a tool, that lesser or no pressure may be applied by a vessel (and that no vessel is required in some embodiments), and/or that consolidation processes may only partly overlap with or may not overlap with fusing of substructure to skin without departing from the scope of the technology described herein. Moreover, one of ordinary skill will appreciate that curative or thermosetting composite materials may be utilized within the scope of the present invention, as described herein.

The system 110 further comprises a metal layer 108, as depicted in FIG. 9. The metal layer 108 may be a metal foil or a metal coating (e.g., metal deposited onto the substructure 168 via electroplating, electro-less plating, plasma spray, cold spray, or the like). Additionally, in some embodiments, the metal layer 108 may serve as a conductive heat sink, similar to the heat sinks in other embodiments above. Furthermore, in some embodiments, the metal layer 108 is a reusable metal mold and a release agent (not shown) is applied between the reusable metal mold and the substructure 168. However, unlike a press, the metal layer 108 may be independent of any mechanical press and may rather be pressed toward the skin 166 by the vacuum bag described herein.

In addition to ensuring that the substructure 168 or at least a portion of the raised segment 177 does not deform during fusing of the substructure 168 and the skin 166, the metal layer 108 may further act as a heat sink in some embodiments. That is, to facilitate heat transfer away from the raised segments 177 of the substructure 168, the metal layer 108 or each of a plurality of metal layers 108 may be conductive heat sinks temporarily applied against at least a portion of the raised segment 177 during the heating process. The metal layer 108 may comprise aluminum or other known conductive heat sink material, and may, in some embodiments, additionally include ridges (and/or other such discontinuities such as ribs or corrugations) along a first side opposite a second side thereof. The ridges may increase the surface area for heat transfer away from the raised segments 177, similar to the heat sink 90 described above. The first side may be oriented to face the flow of coolant fluid from the impeller to further enhance heat transfer. The second side may conform to the shape of a corresponding outer surface of the raised segment 177 against which it is held to optimize conductive heat transfer from the raised segment 177. The metal layer 108 may be held against at least some of the corresponding outer surface of the raised segment 177 and/or the base 178 by air pressure applied via the vacuum bag 198 during fusing or heating processes or by other known means such as fasteners or the like. One of ordinary skill will appreciate that other structures may be placed along raised segments for enhanced heat transfer, and that such structures may be omitted, without departing from the spirit of the present invention.

A vacuum bag 198 substantially identical to the vacuum bag 98 described herein, may be an impermeable membrane placed over the skin 166, the substructure 168, and the metal layer 108, and sealed to the shaping surface 116. For example, a seal 106 may form a perimeter around the composite part being formed and the metal layer 108 such that the skin 166, the substructure 168, and the metal layer 108 are completely enclosed between the shaping surface 116 and the vacuum bag 198, with the exception of a vacuum port 107. Specifically, a pressure differential pressing the vacuum bag 198 toward the shaping surface 116 may be introduced via vacuum through the vacuum port 107 formed through the vacuum bag 198 and/or the tool 114 or using any other methods of introducing pressure differential to the vacuum bag 198 known in the art. For example, in one embodiment, the vacuum port is formed through the vacuum bag 198 and air and/or atmosphere between the vacuum bag 198 and the shaping surface 116 is evacuated via a vacuum and/or forced out via a pressure differential.

In yet another alternative embodiment, similar to that in FIG. 9 and depicted in FIGS. 10a and 10b, the system 110 may comprise all of the same components described in any of the other embodiments above but may further include an insulation layer 186 placed over the metal layer 108, as well as the exposed portions 184 of the skin 166. The insulation layer 186 may be substantially identical to the insulation layer 86 described herein. Similar to embodiments above, the vacuum bag 186 may include a first side adjacent the composite part/metal layer 108 and a second side opposite the first side. The insulation layer 186 may include a first side adjacent the substructure 168 and a second (or upper) side opposite the first side. Still further, each of the raised segment 177 and the base 178 may include an outer surface. A first portion of the insulation layer 186 may cover the outer surface of the base 178 over the faying surfaces and/or at least a portion of the outer surface of the raised segment 177, and a second portion of the insulation layer 186 may cover the exposed portion 184 of the second side of the skin 166. Yet still further, the insulation layer 186 may be sized such that, during the fusing of the substructure 168 to the skin 166, the second side of the insulation layer 186 and a portion of the first side of the vacuum bag 198 covering the raised segment 177 are each maintained below the melting point of the vacuum bag.

In some embodiments, the insulation layer 186 may comprise a plurality of discontinuous panels or the like split, for example, by components of the substructure 168. In some embodiments, panels of the insulation layer 186 may be sized in accordance with desired spacing between respective components of the substructure 168 and/or between a component of the substructure 168 and a reference feature fixed with respect to the shaping surface 116. For example, discontinuous panels of the insulation layer 186 may be laid out in this manner to establish correct positioning of the substructure 168 (or multiple substructures) along the shaping surface 116 and/or desired separation between the components of the substructure 168 (or the multiple substructures). Moreover, such positioning may be maintained until consolidation is complete and/or until the components of the substructure 168 are fused to the skin 166.

FIGS. 10a and 10b depict two different coverage options for the insulation layer 186, however, other coverage patterns may be employed without departing from the scope of the technology described herein. Specifically, as in FIG. 10a, the insulation may cover all of the metal layer 108 and the exposed portions 184 of the skin 166. However in other embodiments, as in FIG. 10b, part or all of the raised segment 177 (or raised segments) of the substructure 168 may remain uncovered by the metal layer 108 and the insulation layer 186, while the vacuum bag 198 continues to cover all of the insulation layer 186 and the uncovered portions of the substructure 168 and/or the metal layer 108. Thus, in accordance with FIG. 10b, at least a portion of the raised segment 188 may protrude outward from the insulation layer 186 and outward from the metal layer 108. Furthermore, in some embodiments, a surface area of the raised segment 177 protruding outward from the insulation layer 186 may be greater than a total surface area of the raised segment 177 protruding outward from the metal layer 108. This provides additional heat sink protection to the raised segment 177 above the insulation layer 186. In some embodiments, heat sinks (in addition to the metal layer 108) may be placed along other locations of the skin 166, as depicted in FIGS. 10a and 10b where a skin heat sink 202 pulls heat out of the skin 166 in a particular vicinity relative to the skin heat sink 202, thus confining thermoplastic melting to locations near the faying surfaces being fused together. FIGS. 10A and 10B depict heat flow through the skin heat sink via arrows 204.

The system 110 may include additional components such as a pressure source configured to provide compression pressures during the curing and/or fusing process(es), a source of resin (e.g., where thermosetting composites are used), and/or other equipment configured to provide matrix material and/or lay up skin on the tool via automated fiber placement (AFP) during the laying up process, without departing from the spirit of the present invention. Furthermore, the system 110 may include additional components for forming the thermoplastic substructure 168, such as a 3D printer, extrusion equipment, and/or various molding machinery without departing from the scope of the present invention.

Alternative methods of manufacturing a composite part joined with the substructure described in FIGS. 9-10b are substantially identical to the steps depicted in FIG. 7 herein, with one additional step of applying the metal layer 108 onto the substructure after the step of laying up the substructure on the skin. Other steps described in FIG. 7 can be added or omitted in the use of the system 110 to form the composite part without departing from the scope of the technology described herein. Furthermore, the step of applying the insulation layer as depicted in FIG. 7 may further comprise applying insulation on only a portion of the metal layer 108, as depicted in FIG. 10b.

At least a portion of the steps of a method 1100 for manufacturing a composite part from a composite material using the system 110 in accordance with various embodiments of the present invention are listed in FIG. 11. The steps may be performed in the order as shown in FIG. 11, or they may be performed in a different order. Further, some steps may be performed concurrently as opposed to sequentially. In addition, some steps may be omitted. Still further, embodiments of the present invention may be performed using systems other than system 110 without departing from the spirit of the present invention (e.g., including but not limited to the use of any components described in reference to system 10).

In connection with step 1101, a skin may be laid up on a shaping surface of a tool. The skin may include an outer surface and an inner surface, and the shaping surface of the tool may be configured to maintain the outer surface of the skin in a shape of an outer mold line. Further, the inner surface of the skin may have a first faying surface.

Laying up the skin may include layering multiple plies consecutively on top of one another. Advantageously, embodiments of the present invention may permit layering the plies without the need for intervening heating and/or rolling steps commonly associated with such layup processes. That is, typical AFP processes will heat and/or roll plies during a layup process in order to at least partly consolidate layers prior to fusing skin to substructure. Embodiments of the present invention may reduce or omit such heating and/or rolling steps, and instead perform much or all of the consolidation process concurrently with the fusing process.

In connection with step 1102, the method 1100 may include laying a substructure up on the inner surface of the skin. The substructure may include an outer margin which, like the skin, may be formed to the shape of the outer mold line by the support of the shaping surface of the tool. The substructure may include a base and a raised segment fixed to and/or integral with the base. The base may include a second faying surface. The second faying surface of the substructure may be laid against and in contact with the first faying surface of the skin. Areas outside of the second faying surface (i.e., those not in contact with the substructure) may be considered exposed portions of the inner surface of the skin, as described above. In some embodiments, a release layer may be applied along the exposed portion of the inner surface of the skin. The release layer may comprise Polytetrafluoroethylene or other materials outlined above.

In connection with step 1103, the method 1100 may include applying at least one metal layer over at least a portion of the substructure. For example, application of the metal layer may result in the substructure being fully enclosed between the skin and the metal layer. That is, the metal layer may be placed over and conform to at least a portion of the substructure and the metal layer may comprise a peripheral portion that abuts the skin. In some embodiments, pressure applied by the vacuum bag via a pressure differential, as described below, may hold a peripheral portion or peripheral portions of the metal layer down against the skin. The metal layer may be placed over at least a portion of the substructure via electroless deposition of a metal coating or a foil sheet shaped onto the non-faying surfaces of the substructure. Additionally or alternatively, in some embodiments, the metal layer is a reusable metal mold and a release agent is applied between the reusable metal mold and the substructure.

In connection with step 1104, the method 1100 may further include applying at least one insulation layer over the metal layer covering the substructure and/or at least a portion of the metal layer applied to the substructure and over exposed portions of the inner surface of the skin not in contact with the substructure. The insulation layer may be sized and may consist of sufficient insulative materials so that application of heat to the shaping surface (during the fusing process described below) causes each of the plurality of composite layers of the skin to fuse with adjacent ones of the plurality of composite layers during the fusing of the substructure to the skin. In addition, the insulation layer may be sized and may consist of sufficient insulative materials so that the application of heat to the shaping surface during the fusing process causes the second faying surface and the first faying surface to melt and fuse with one another, joining the skin to the substructure.

In some embodiments, discontinuous panels of the insulation layer may be consecutively laid—e.g. beginning at a reference feature of the shaping surface and proceeding along the shaping surface—between components of the substructure. Laying of the insulation panels may occur concurrently with laying of the substructure and/or metal layer and/or positioning of the components of the substructure and/or metal layer may be adjusted as the insulation panels are laid up to establish a desired separation between a plurality of substructures being laid in accordance with methods herein.

One of ordinary skill will appreciate that thermosetting materials may be used with embodiments of the present invention, and the insulation may be engineered, for example, with the goal of achieving curing temperatures (rather than melting/fusing temperatures), for example for thermosetting materials and/or adhesives, without departing from the spirit of the present invention. One of ordinary skill will also appreciate that such other embodiments may include additional steps, for example injecting or infusing matrix material where prepreg reinforcement material is not used. Such other steps are known for use in constructing composite parts and are therefore not described in detail herein.

In connection with step 1105, the method may include applying a vacuum bag to cover the skin, the substructure, and the metal layer such that the skin, the substructure, and the metal layer are at least partly and preferably fully enclosed by the combination of the vacuum bag and the shaping surface of the tool. The vacuum bag comprises material having a melting point above the temperature of the coolant fluid. It should be noted that nominal changes in melting point with variation in coolant fluid pressure are disregarded for purposes of this disclosure.

Further, embodiments of the present invention may include placing a conductive heat sink between the raised segment of the substructure and the vacuum bag or between portions of the skin and the vacuum bag and maintaining the placement of the heat sink during fusing of the substructure to the skin. Further, as noted above, the vacuum bag may include a first side adjacent the composite part and a second side opposite the first side. The insulation layer may include a first side adjacent the substructure and a second (or upper) side opposite the first side. Still further, each of the raised segment and the base may include an outer surface. A first portion of the insulation layer may cover the outer surface of the base and/or at least a portion of the raised segment, and a second portion of the insulation layer may cover the exposed portion of the second side of the skin. In some embodiments, the insulation layer may cover all of the raised segment, the outer surface of the base, and the exposed portion of the second side of the skin. Yet still further, the insulation layer may be sized such that, during the fusing of the substructure to the skin, the second side of the insulation layer and a portion of the first side of the vacuum bag covering the raised segment are each maintained below the melting point of the vacuum bag. Likewise, at least a portion of the raised segment that remains uncovered by the insulation layer may be maintained below the melting point of the thermoplastic material that the substructure is comprised of.

In connection with step 1106, the method 1100 may include continuously or substantially continuously flowing a coolant fluid into contact with and over the second side of the vacuum bag. The flow may be maintained throughout most or all of the fusing process outlined below. Preferably, the coolant fluid is maintained at a lower temperature than that of the composite part. Additionally or alternatively, the coolant fluid may be maintained at a lower temperature than that of each of the raised segments of the substructures and/or at a lower temperature than that of the skin. The coolant fluid flow may be applied against the second side of the vacuum bag at least in part by an impeller and a vane, the vane being shaped and positioned to receive the flow of coolant fluid from the impeller and redirect the flow of the coolant fluid toward the vacuum bag.

In connection with step 1107, the method 1100 may include pressurizing the coolant fluid. The pressurization may be achieved using a vessel comprising an autoclave or the like. It is foreseen that atmospheric pressure (e.g., at sea level) may provide sufficient pressure on the vacuum bag without departing from the spirit of the present invention. The pressure of the coolant fluid may be at or above 101.3529 kPa (14.7 psia) or, more preferably, at or above 689.476 kPa (100 psia), and may be maintained at substantially the same pressure during the fusing of the substructure to the skin.

In connection with step 1108, the method 1100 may include applying heat to the shaping surface to fuse the substructure to the skin by melting along the first and second faying surfaces. As noted in various embodiments above, thermocouples may be embedded along a platform of the tool to provide temperature sensing feedback to a controller. The controller may control the output of one or more heating elements to provide uniform and steady-state heating or differential heating to the shaping surface for fusing of the substructure to the skin and concurrent consolidation of the plies of the skin.

In connection with step 1109, the method 1100 may include removing the vacuum bag and fused composite part from the tool. The coolant fluid may be depressurized and the flow may be halted in connection with such removal. Furthermore, in connection with step 1110, the method 1100 may include removing the metal layer and/or the vacuum bag from the fused composite part. This removal may be facilitated by the release film, release layer, or release agent between the metal layer and the substructure, and/or between the vacuum bag and the substructure and/or the metal layer.

Although the invention has been described with reference to the embodiments illustrated in the attached drawing figures, it is noted that equivalents may be employed and substitutions made herein without departing from the scope of the invention as recited in the claims.

For instance, it should be noted that composite parts are typically formed from composite material, as is known in the art, which generally includes at least two constituent components—a reinforcement material and a matrix material. The reinforcement material generally provides mechanical strengthening properties, such as high tensile strength, to the composite material, while the matrix material acts as a binder to hold the reinforcement material together. The reinforcement material and the matrix material may possess additional properties not discussed herein. Furthermore, the composite material may include additional components not discussed herein.

Examples of reinforcement materials that may be used with the current invention include, but are not limited to, fiber materials such as carbon fiber, boron fiber, fiberglass, aramid fiber, ceramic fiber, and the like without departing from the spirit of the present invention. In the case of fiber-based reinforcement materials, the fiber may exist in one of at least two forms—either preimpregnated (prepreg), in which the fiber may be coated with a matrix material, such as resin or thermoplastic polymer, or as dry fiber, with no matrix material incorporated prior to part manufacture. The matrix material may typically be in the form of thermoplastic polymers such as polycarbonates, polyamides, polyphenylene sulfide, polyetherimide, polyetheretherketone, polyetherketoneketone, and the like. The matrix material may also or alternatively be in the form of thermosetting polymer resins, such as epoxies, bismaleimides, vinyl esters, phenolics, polyimides and the like, among others. It should be noted that thermoplastic film adhesives are preferably incorporated between parts comprising thermosetting matrix materials, and that fixing one such part to another includes melting the thermoplastic film adhesives. It should also be noted that mixtures of composite materials may be used to form a single composite part without departing from the spirit of the present invention.

Having thus described various embodiments of the invention, what is claimed as new and desired to be protected by Letters Patent includes the following:

1. A method for fusing thermoplastic substructures with thermoplastic composite skins to form composite structures, the method comprising:

laying a skin comprising an outer surface and an inner surface on a shaping surface of a tool configured to maintain the outer surface in a shape of an outer mold line, the inner surface of the skin comprising a first faying surface;

laying a substructure on the inner surface of the skin, the substructure comprising a second faying surface and a non-faying surface, the second faying surface contacting the first faying surface of the skin, wherein the substructure is a thermoplastic component made by a molding process, three-dimensional printing, or extrusion prior to being laid on the inner surface of the skin;

applying at least one metal layer over at least a portion of the substructure;

applying at least one insulation layer over at least a portion of the metal layer and over exposed portions of the inner surface of the skin not in contact with the substructure;

applying a vacuum bag over the skin and the substructure such that the skin and the substructure are enclosed by the combination of the vacuum bag and the shaping surface of the tool; and applying heat to the shaping surface to fuse the substructure to the skin such that the skin exceeds its melting point;

wherein the substructure is fully enclosed between the skin and the metal layer.

2. The method of claim 1, wherein the vacuum bag comprises a first side adjacent the composite part and a second side opposite the first side, further comprising flowing a coolant fluid into contact with and over the second side of the vacuum bag during the fusing of the substructure to the skin, the coolant fluid being at a lower temperature than the skin.

3. The method of claim 1, wherein the metal layer is placed over the at least a portion of the substructure via electroless deposition of a metal coating.

4. The method of claim 1, wherein the metal layer is a foil sheet shaped onto non-faying surfaces of the substructure.

5. The method of claim 1, wherein the metal layer is a reusable metal mold and a release agent is applied between the reusable metal mold and the substructure.

* * * * *